US009318116B2

(12) United States Patent
Mangold

(10) Patent No.: US 9,318,116 B2
(45) Date of Patent: Apr. 19, 2016

(54) ACOUSTIC DATA TRANSMISSION BASED ON GROUPS OF AUDIO RECEIVERS

(71) Applicant: Disney Enterprises, Inc., Burbank, CA (US)

(72) Inventor: Stefan Mangold, Liebefeld (CH)

(73) Assignee: Disney Enterprises, Inc., Burbank, CA (US)

(*) Notice: Subject to any disclaimer, the term of this patent is extended or adjusted under 35 U.S.C. 154(b) by 152 days.

(21) Appl. No.: 14/106,317

(22) Filed: Dec. 13, 2013

(65) Prior Publication Data

US 2014/0172141 A1 Jun. 19, 2014

Related U.S. Application Data

(60) Provisional application No. 61/737,723, filed on Dec. 14, 2012.

(51) Int. Cl.
| | | |
|---|---|---|
| *G06F 17/00* | (2006.01) | |
| *G10L 19/018* | (2013.01) | |
| *H04B 11/00* | (2006.01) | |
| *H04L 1/02* | (2006.01) | |

(52) U.S. Cl.
CPC .............. *G10L 19/018* (2013.01); *H04B 11/00* (2013.01); *H04L 1/02* (2013.01)

(58) Field of Classification Search
CPC ......... G10L 19/018; H04B 11/00; H04L 1/02
USPC .......................................................... 700/94
See application file for complete search history.

(56) References Cited

U.S. PATENT DOCUMENTS

| | | | |
|---|---|---|---|
| 6,266,430 | B1 | 7/2001 | Rhoads |
| 7,171,018 | B2 * | 1/2007 | Rhoads ............. G06F 17/30026 382/100 |
| 7,188,186 | B1 | 3/2007 | Meyer et al. |
| 7,362,781 | B2 | 4/2008 | Rhoads |
| 7,460,991 | B2 | 12/2008 | Jones et al. |

(Continued)

FOREIGN PATENT DOCUMENTS

EP    1332470 B1    9/2010

OTHER PUBLICATIONS

Frigg, Roman, Multi-Channel Acoustic Data Transmission to Ad-Hoc Networks of Mobile Devices, Master's Thesis, Apr. 2013, Eidgenössische Technische Hochschule Zürich, Department of Computer Science, Zürich, Switzerland, 100 pages.

(Continued)

*Primary Examiner* — Paul McCord
(74) *Attorney, Agent, or Firm* — Patterson + Sheridan, LLP

(57) ABSTRACT

Techniques are disclosed for acoustic data reception. Playback of modified audio content is acoustically detected by a first receiving entity and a second receiving entity operatively connected to the first receiving entity via a network. The modified audio content is generated by encoding specified data into specified audio content such that the modified audio content satisfies a predefined signal constraint characterizing imperceptibility of any differences between playback of the specified audio content and playback of the modified audio content. The specified data is collaboratively decoded based on the acoustically detected playback of the modified audio content and by the first receiving entity and the second receiving entity using the network and according to a predefined diversity scheme.

20 Claims, 16 Drawing Sheets

(56) References Cited

U.S. PATENT DOCUMENTS

| | | | |
|---|---|---|---|
| 7,720,098 B1 | 5/2010 | Allen et al. | |
| 7,805,156 B1 | 9/2010 | Allen et al. | |
| 8,156,433 B2 | 4/2012 | Pietrusko et al. | |
| 8,451,086 B2* | 5/2013 | Petrovic | G10L 19/018 340/12.5 |
| 8,745,703 B2* | 6/2014 | Lambert | G06F 21/554 726/5 |
| 8,959,016 B2* | 2/2015 | McKenna | G10L 19/018 704/205 |
| 2002/0150165 A1 | 10/2002 | Huizer | |
| 2004/0095907 A1* | 5/2004 | Agee | H04B 7/0417 370/334 |
| 2004/0100928 A1* | 5/2004 | Ben-David | H04B 1/7105 370/335 |
| 2005/0180315 A1* | 8/2005 | Chitrapu | H04B 7/2628 370/208 |
| 2005/0262351 A1* | 11/2005 | Levy | G06Q 20/401 713/176 |
| 2005/0289224 A1* | 12/2005 | Deslippe | H04L 67/125 709/208 |
| 2007/0121939 A1* | 5/2007 | Olesen | H04L 63/12 380/201 |
| 2007/0255785 A1* | 11/2007 | Hayashi | G06F 17/30017 709/204 |
| 2007/0260958 A1* | 11/2007 | Li | H04L 1/0048 714/755 |
| 2008/0002854 A1* | 1/2008 | Tehranchi | G06F 21/10 382/100 |
| 2008/0045140 A1* | 2/2008 | Korhonen | H04M 1/7253 455/3.06 |
| 2008/0077261 A1* | 3/2008 | Baudino | H04H 20/630 700/94 |
| 2008/0152165 A1* | 6/2008 | Zacchi | H04R 5/04 381/77 |
| 2008/0165701 A1 | 7/2008 | Ananthanarayanan et al. | |
| 2008/0301304 A1* | 12/2008 | Chitsaz | H04L 63/0245 709/228 |
| 2008/0317066 A1* | 12/2008 | Trine | G10L 19/008 370/479 |
| 2010/0112991 A1* | 5/2010 | Hannaby | H04M 1/2155 455/414.3 |
| 2010/0114344 A1* | 5/2010 | Hannaby | G06Q 30/02 700/94 |
| 2010/0305730 A1 | 12/2010 | Glitsch et al. | |
| 2011/0016172 A1 | 1/2011 | Shah | |
| 2011/0214143 A1 | 9/2011 | Rits et al. | |
| 2011/0273455 A1* | 11/2011 | Powar | G06F 17/30769 345/473 |
| 2012/0077466 A1* | 3/2012 | O'Mahony | H04N 21/234327 455/414.1 |
| 2012/0122429 A1* | 5/2012 | Wood | H04L 63/102 455/414.1 |
| 2012/0134238 A1 | 5/2012 | Surprenant et al. | |
| 2012/0271442 A1 | 10/2012 | Shah et al. | |
| 2013/0110981 A1* | 5/2013 | Thornburgh | H04L 29/06 709/219 |

OTHER PUBLICATIONS

Ananthanarayanan et al. "Collaborative Downloading for Multi-homed Wireless Devices", Mar. 21, 2013, 6 pages.

Lin et al. "Dynamic Bandwidth Aggregation for a Mobile Device with Multiple Interfaces", Mar. 19, 2013, 5 pages.

Bok et al. "Wireless Multimedia Acoustic Transmission with MIMO-OFDM", Jan. 1, 2011, 130 pages.

Frigg et al. "CinemaCom: Acoustic Data Transmission to Collaborating Smartphones", 9 pages.

Matsuoka et al. "Acoustic OFDM: Embedding High Bit-Rate Data in Audio", S. Satoh, F. Nack, and M. Etoh (Eds): MMM2008, LNCS 4903, pp. 498-507, 2008. Springer-Verlag Berlin Heidelberg 2008.

* cited by examiner

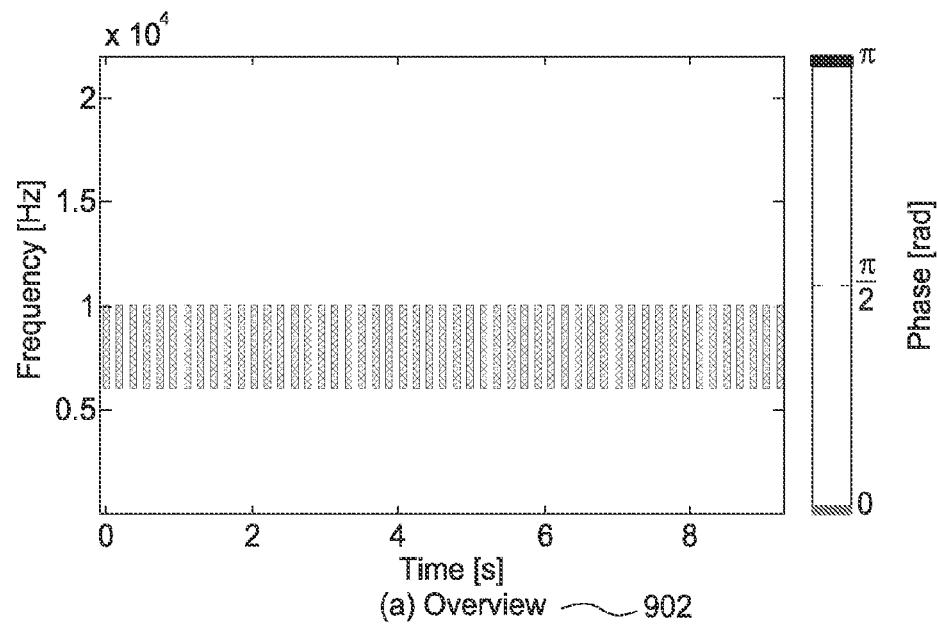
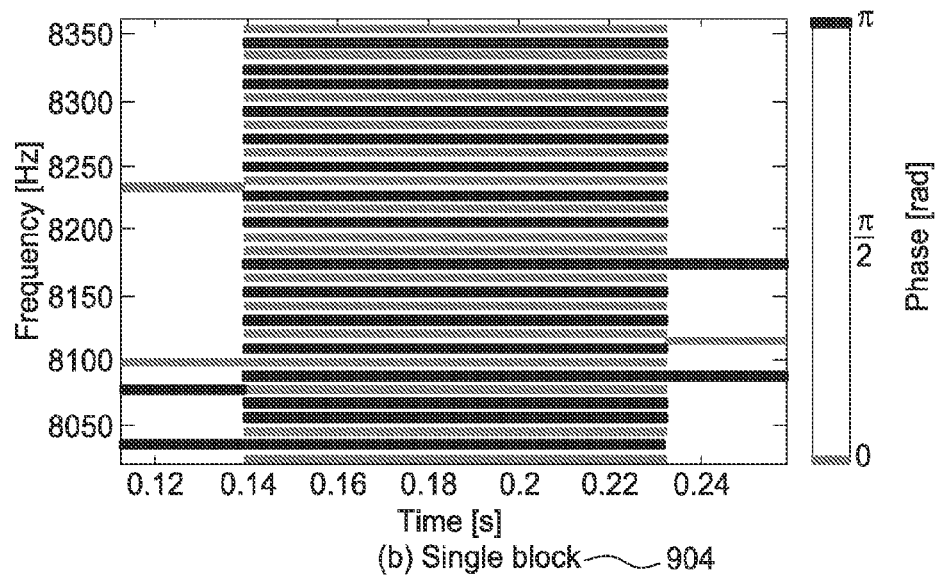
Phase spectrogram: An audio file containing a random message embedded in the range of 0.6 - 1 kHz using absolute phase coding with interference cancellation
FIG. 9

1700

| Parameter / Default value | Description |
|---|---|
| Server mode = OFF | A boolean that determines whether this receiver acts as a server for the diversity scheme. |
| ASCII payload = OFF | A boolean, if ON, the received bits are interpreted as ASCII text. |
| Logging = OFF | A boolean that specifies whether log files with statistics for performance evaluation shall be written |
| Block size = 4096 | The block size (number of subbands) for the MCLT |
| Lower limit = 5900 | The lower frequency limit of the spectrum used for data extraction in Hertz |
| Lower limit = 10050 | The upper frequency limit of the spectrum used for data extraction in Hertz |
| Sync threshold = 0.4 | The signal strength threshold $\tau 1$ used for synchronization |
| Number of runs = 3 | Number of additional iterations of the synchronization algorithm to verify the block offset computed in the first run |
| Sync block interval = 20480 | The interval between sync blocks (first MCLT block of a packet) in samples, implicitly defines the packet size |

FIG. 17

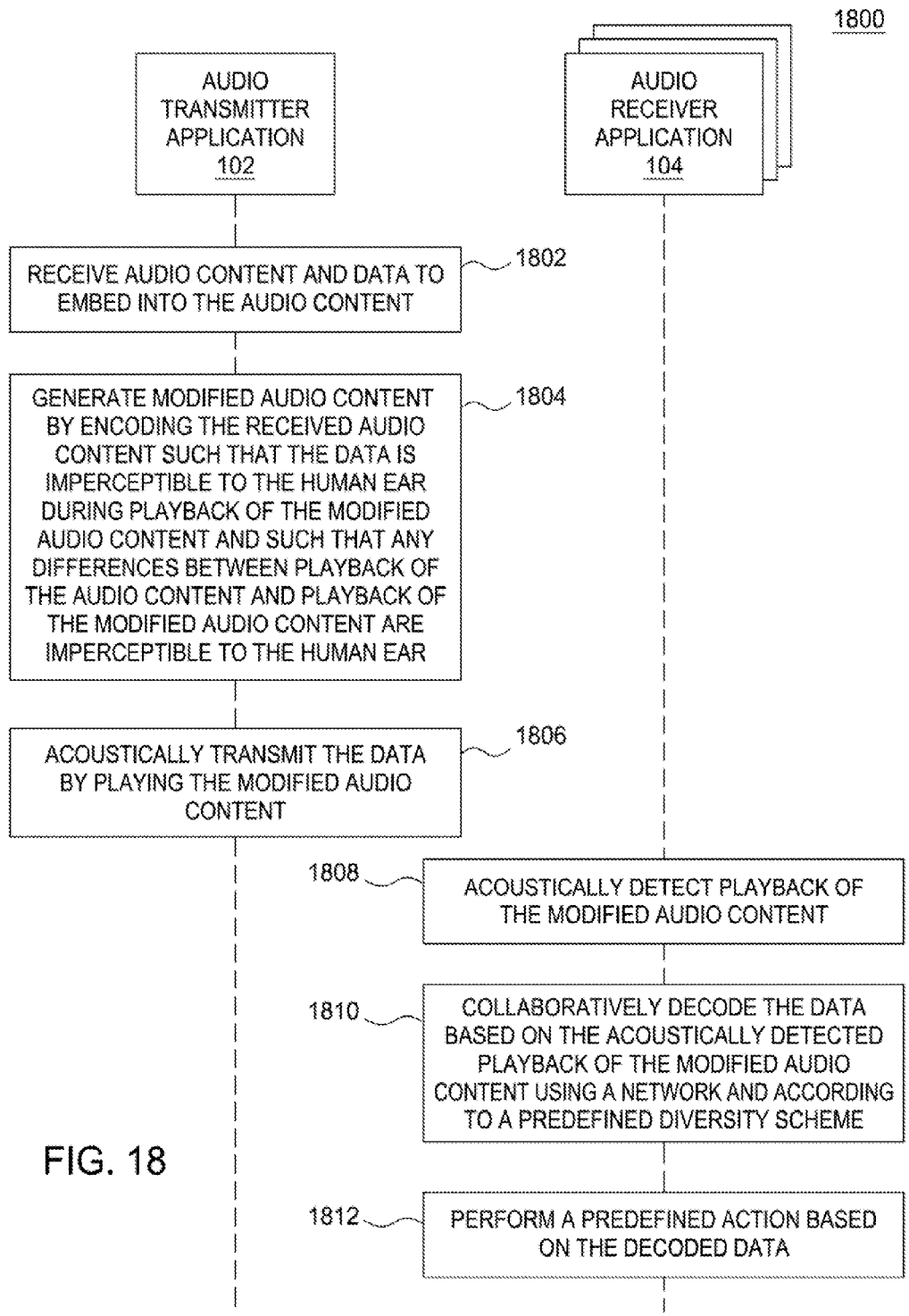

ACOUSTIC DATA TRANSMISSION BASED ON GROUPS OF AUDIO RECEIVERS

CROSS-REFERENCE TO RELATED APPLICATIONS

This application claims benefit of U.S. provisional patent application Ser. No. 61/737,723, filed on Dec. 14, 2012, which provisional patent application is herein incorporated by reference in its entirety.

BACKGROUND

At least in some contexts, acoustic data transmission may be used to communicate arbitrary information via sound from an output device, such as a loudspeaker system, to an input device, such as a device equipped with a microphone. Today, many locations are configured with loudspeaker systems, and furthermore, mobile devices equipped with microphones are prevalent. Some acoustic data transmission systems, such as those used for underwater communication, generate specific, audible sounds based on the message desired to be transmitted.

SUMMARY

Embodiments presented in this disclosure provide a method, computer-readable medium, and system to perform an operation for acoustic data reception. The operation includes acoustically detecting playback of modified audio content by a first receiving entity. The modified audio content includes perceptible audio content and data encoded as imperceptible audio content. The operation also includes acoustically detecting playback of the modified audio content by a second receiving entity operatively connected to the first receiving entity via a network. The operation also includes decoding the data based on the acoustically detected playback of the modified audio content. The data is collaboratively decoded by the first receiving entity and the second receiving entity using the network and according to a diversity scheme. The operation also includes performing an action by the first receiving entity based on the collaboratively decoded data.

BRIEF DESCRIPTION OF THE DRAWINGS

So that the manner in which the above recited features presented in this disclosure can be understood in detail, a more particular description, briefly summarized above, may be had by reference to embodiments, some of which are illustrated in the appended drawings. It is to be noted, however, that the appended drawings illustrate only typical embodiments presented in this disclosure and are therefore not to be considered limiting of its scope, for the disclosure may admit to other equally effective embodiments.

FIG. 9 is a diagram plotting a phase spectrum over time for absolute phase coding with interference cancellation, according to one embodiment presented in this disclosure.

FIG. 17 is a table illustrating configurable parameters of the receiver application, according to one embodiment presented in this disclosure.

FIG. 18 is a flowchart depicting a method for acoustic data transmission, according to one embodiment presented in this disclosure.

DETAILED DESCRIPTION

Figure 1:
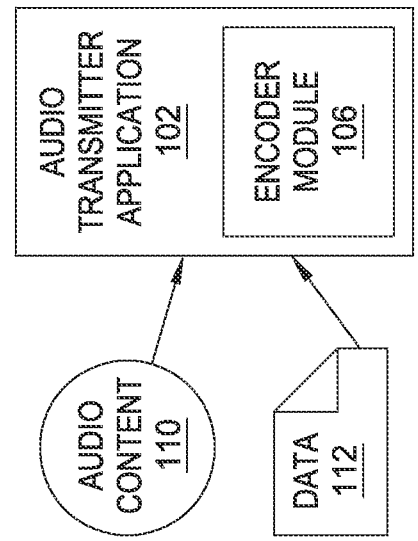
FIG. 1 is a data flow diagram illustrating a system for acoustic data transmission, according to one embodiment presented in this disclosure.

Embodiments presented in this disclosure generally provide techniques for acoustic data transmission. In various contexts, a dedicated network infrastructure is not practical or affordable, but portable devices such as smartphones may nevertheless be popular and prevalent. Collaborative audio transmission allows dissemination of content in such settings to foster new approaches to interactive and enriched story telling or audience engagement. Accordingly, one embodiment provides an audio transmitter application and one or more audio receiver applications. The audio transmitter application is configured to receive audio content, and data (such as text) to embed into the audio content. Depending on the embodiment, the text may include lyrics of the audio content, information about video content associated with the audio content, information about physical or virtual goods pertaining to the audio content or the video content, etc. The audio transmitter application is further configured to generate modified audio content by encoding the text into the audio content.

At least in some embodiments, the text may be encoded such that the text is imperceptible to the human ear during playback of the modified audio content. Additionally or alternatively, the text may be encoded such that any differences between playback of the audio content and playback of the modified audio content are imperceptible to the human ear. At least in some embodiments, imperceptibility to the human ear is measured based on a predefined, objective standard, e.g., the modified audio content satisfying predefined signal characteristics defined based on typical human hearing attributes. In an alternative embodiment, the text is encoded such that any differences between playback of the audio content and playback of the modified audio content are only perceptible to a predefined degree to the human ear. The degree of perceptibility may be tailored to suit the needs of a particular case, such as to manage a tradeoff between amount of text desired to be encoded and imperceptibility of the encoded text.

In one embodiment, the audio transmitter application is further configured to acoustically transmit the text to at least one of the audio receiver applications, such as via a movie theater sound system. The audio receiver application is configured to acoustically detect playback of the modified audio content, such as via a microphone module of a portable device. The audio receiver application is further configured to decode the text from the acoustically detected playback of the modified audio content. The audio receiver application can then output the decoded text, such as via a display screen and/or internal speakers of the portable device. Further, in some embodiments, to reduce bit error rates, multiple instances of the audio receiver application may collaborate in terms of each instance acoustically detecting playback of the modified audio content and then collaboratively decoding the text therefrom, such as based on a predefined diversity scheme (i.e., as opposed to merely determining a best-performing audio receiver application and relaying its results to the other instances of the audio receiver application). Doing so may improve reliability of the transmission link without having to increase redundancy in data transmission, thereby supporting higher effective data rates. By acoustically transmitting data using the techniques described herein, information of interest may be delivered to users more seamlessly, thus providing the users with a more immersive multimedia experience at least in some cases, relative to alternative approaches that do not involve acoustic data transmission or collaborative decoding techniques.

FIG. 1 is a data flow diagram illustrating a system 100 for acoustic data transmission, according to one embodiment presented in this disclosure. As shown, the system 100 includes an audio transmitter application 102 and an audio receiver application 104. The audio transmitter application 102 includes an encoder module 106, and the audio receiver application 104 includes a decoder module 108. In one embodiment, the audio transmitter application 102 receives audio content 110 and data 112 to encode into the audio content 110. Depending on the embodiment, any type of data may be used according to the techniques disclosed herein. For illustrative purposes only, at least some embodiments are herein described in conjunction with the particular embodiment of the data 112 being text. In alternative embodiments, the data may include other data types such as, without limitation, a network address (e.g., an Internet Protocol (IP) address) or Global Positioning System (GPS) coordinates. Depending on the embodiment, the receiver application 104 decodes the data 112 and executes a predefined action based on the decoded data, such as generating an output for display based on the decoded data.

In one embodiment, once the audio transmitter application 102 receives the audio content 110 and the text, the audio transmitter application 102 generates modified audio content 114 by encoding the text into the audio content 110, such as based on a predefined set of acoustic text encoding rules. In one embodiment, the set of acoustic text encoding rules receive, as an input parameter, a desired degree of imperceptibility associated with text to be encoded. As described above, the text may be encoded such that the text is imperceptible to the human ear during playback of the modified audio content. Additionally or alternatively, the text may be encoded such that any differences between playback of the audio content and playback of the modified audio content are imperceptible to the human ear.

In one embodiment, the audio transmitter application 102 then acoustically transmits the modified audio content 114 to the audio receiver application 104, by playing the modified audio content 114 having encoded data 116, which may be encoded text. The audio receiver application 104 acoustically detects the playback of the modified audio content. The audio receiver application 104 then decodes the text from the acoustically detected playback of the modified audio content. The audio receiver application 104 then outputs decoded data 118, such as decoded text. Accordingly, the data 112 is acoustically transmitted from the audio transmitter application 102 to the audio receiver application 104, providing the users with a more immersive multimedia experience at least in some cases.

Figure 2:
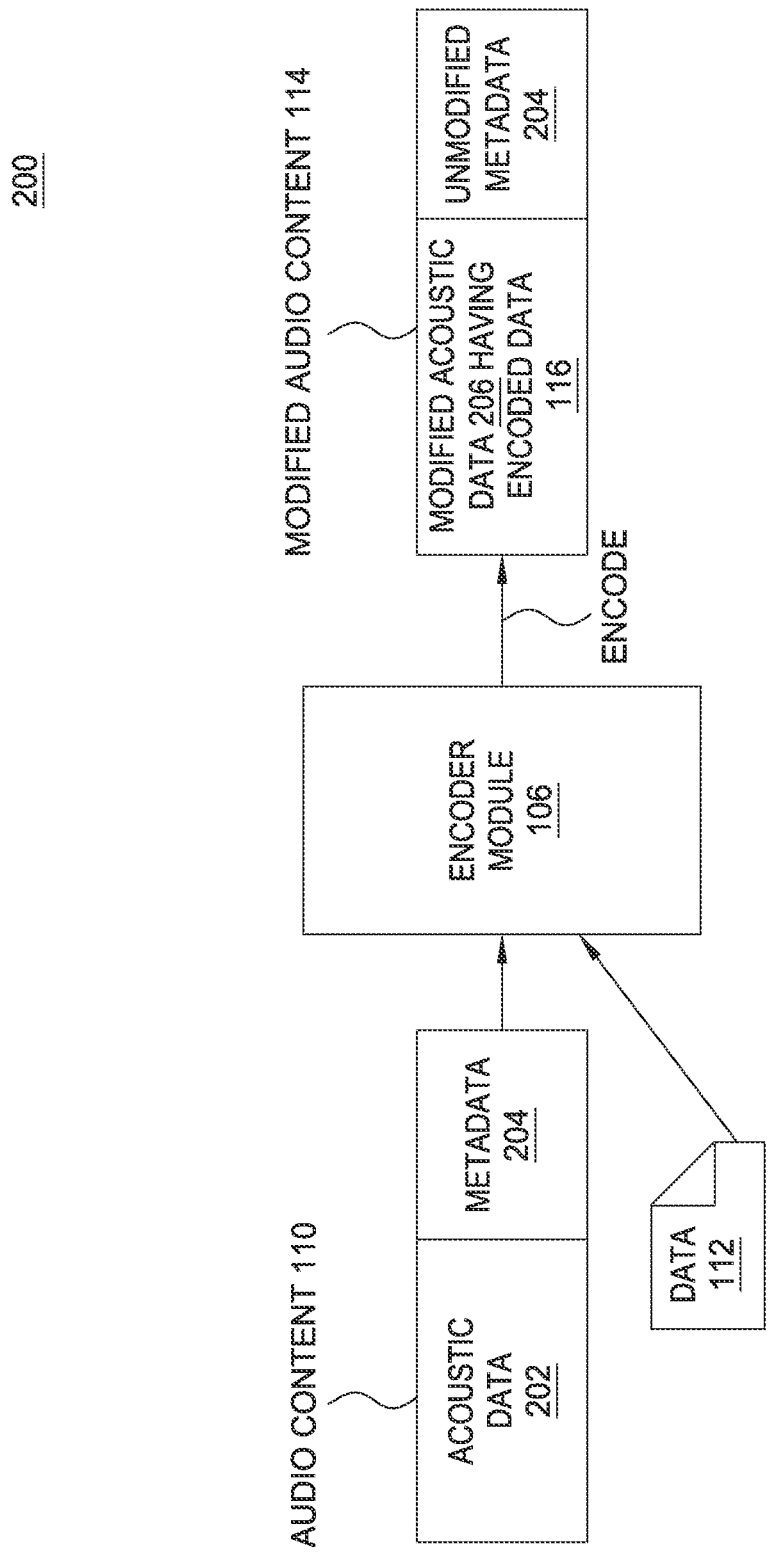
FIG. 2 is a data flow diagram illustrating components of audio content for acoustic transmission, according to one embodiment presented in this disclosure.

FIG. 2 is a data flow diagram 200 illustrating components of the audio content 110 of FIG. 1, according to one embodiment presented in this disclosure. As shown, the audio content 110 includes acoustic data 202 and metadata 204. In one embodiment, acoustic data 202 includes data affecting any aural aspect of playback of the audio content 110—i.e., any aspect of sound production based on the audio content 110. Metadata 204, also referred to herein as non-acoustic data, includes any data not intended to affect any aural aspect of playback of the audio content 110. In some embodiments, the metadata 204 may include a media header pertaining to audio content 110. The metadata 204 may include one or more properties of the audio content or of video content associated with the audio content. For instance, the metadata 204 may include such properties as track length, track bitrate, song name, album name, album release year, artist name, track number, track release year, composer name, music genre name, movie name, movie genre name, movie release year, movie director name, etc. Additionally or alternatively, the metadata 204 may include one or more information properties of a file in which the audio content and/or video content is stored, such as file permissions, creation date, modified date, last access date, etc. Other properties not departing from the scope of the present disclosure are broadly contemplated.

In one embodiment, the encoder module 106 of the audio transmitter application 102 generates the modified audio content 114 based on the audio content 110 and the data 112. As shown, the modified audio content 114 includes modified acoustic data 206 having the encoded data 116. The modified audio content 114 further includes unmodified metadata 204, which remains unchanged relative to the metadata 204. In alternative embodiments, however, the modified audio content 114 includes metadata reflecting one or more changes as a result of the acoustic data 202 being modified.

In one embodiment, the modified acoustic data 206 may represent a modified set of sound waves compared to the acoustic data 202. For example, sound waves may be added to or removed from the set, and properties of sound waves, such as frequency or amplitude, may be modified. As described above, the encoded data 116 may be encoded such that the encoded data 116 is imperceptible to the human ear during playback of the modified audio content 114. Additionally or alternatively, the encoded data 116 may be encoded such that any differences between playback of the audio content 110 and playback of the modified audio content 114 are imperceptible to the human ear. The encoded data 116 may then be played back and detected by the audio receiver application 104. The data may then be decoded by the decoder module 108 of the audio receiver application 104 and output in order to provide users with a more immersive multimedia experience at least in some cases. At least in some embodiments, the data encoding may be performed in real-time relative to playback of the modified audio content. Additionally or alternatively, the data decoding may occur in real-time relative to detecting the playback of the modified audio content.

As described above, in one embodiment, the audio transmitter application 102 generates modified audio content by encoding the data into the audio content, such as based on a predefined set of acoustic text encoding rules. The predefined set of acoustic text encoding rules may apply information hiding techniques to embed the data into the audio content. Information hiding techniques allow data to be embedded into different types of media files such as images, videos or audio signals. Accordingly, these media files, also referred to as cover files, serve as carriers for hidden messages. In contrast to cryptography, information hiding is a form of security through obscurity. This means that a secret message is only safely hidden in a cover file, as long as the algorithm used to extract the message is not exposed, while on the other hand, a cryptography scheme is to remain secure even if its mechanisms are exposed.

The field of information hiding may generally be divided into steganography and watermarking. Watermarking is typically applied to encrypt any kind of data to protect it from unauthorized access, while steganography is typically used for imperceptible communication. Watermarking and steganography are employed to send hidden messages such that no one, apart from the sender and the intended recipient, suspects the existence of the message. Watermarking was developed for copyright protection, and a digital watermark has a purpose of identifying the ownership of digital content such as images, videos or audio files. In contrast to steganography, where the focus lies on imperceptibility of the embedded message, robustness against unauthorized removal of digital watermarks is perhaps the most important property of a watermarking scheme.

Information hiding methods applied to sound signals may also be referred to as audio hiding. One example of audio hiding is digital, audio watermarks that can be embedded into soundtracks. These watermarks may be used for copyright protection or content recognition. Audio hiding can also be used for data transmission over acoustic channels, in which case the audio signal with the embedded message may be played back with a loudspeaker at the transmitter and recorded with a microphone at the receiver. One example is encoding information pertaining to a movie into the movie soundtrack. In this example, the hidden message is imperceptible merely from listening to playback of the movie soundtrack, while a computing device with a microphone can decode the embedded information using the techniques disclosed herein. This use of audio hiding may be referred to herein as acoustic data transmission. At least in some embodiments, acoustic data transmission can rely on the same information hiding techniques used in audio watermarking.

In some embodiments, even when using the same or similar audio hiding techniques for the applications of watermarking and acoustic data transmission, these applications may have different requirements. For instance, while it is generally desirable for watermarking techniques to be robust against signal processing distortions and malicious attacks, watermarking techniques do not necessarily need to support high bit rates, e.g., bit rates at or higher than a predefined threshold rate, because he amount of data to be embedded is typically low. In acoustic data transmission, robustness of the signal is desired given digital-to-analog/analog-to-digital conversion as well as interferences and noise that may occur during transmission over an acoustic channel. In addition, a high bit rate is also desired in order to transmit as much information as possible and minimizing or reducing any audible decrease in sound quality. At least in some embodiments, there is a tradeoff between robustness, bit rate and audio quality in that embedding redundant data improves robustness at the cost of supporting only a lower bit rate. It is thus desired to increase bandwidth and robustness while keeping the embedded messages imperceptible and while maintaining sound quality.

Some examples of audio hiding techniques include low-bit coding, echo hiding, spread spectrum hiding, and phase coding. In low-bit coding, the least significant bit (LSB) of each sample is replaced with the message bit to be embedded. Doing so allows for high data rates at least compared to other audio hiding techniques. For instance, a mono audio signal sampled at 44.1 kHz, i.e., 44100 samples per second, can contain 44100 hidden bits per second. On the other hand, low-bit coding may not be robust against many kinds of signal processing. Thus, low-bit coding is inapplicable in the audio watermarking domain, because low-bit-encoded watermarks would readily be destroyed by filtering, resampling, and other audio processing transformations. For instance, when transmitting an audio file with low-bit-encoded information over an acoustic channel, the hidden message is likely no longer decodable at the receiver, because many of the least significant bits may have been altered in the process. Further, attackers can remove watermarks merely be altering the least significant bit of each sample. Accordingly, low-bit coding may not necessarily be suitable for acoustic data transmission. Despite its limitations, however, low bit coding may be used in some embodiments, depending upon the particular context.

Echo hiding exploits the inability of the human auditory system (HAS) to distinguish artificially introduced echoes in an audio signal, from those echoes that a room itself might naturally introduce owing to the acoustics of the room. Accordingly, the time offset between the original signal and an embedded echo can be used to encode a desired message. For instance, an early echo could encode a bit with the value of 1, whereas an echo with a longer delay could encode a bit with the value of 0. By carefully managing the echo offsets and amplitudes, the embedded information becomes nearly imperceptible. Even when an audio file carrying an echo-encoded message might sound slightly different from the corresponding, original audio, the echoes are still not perceived as distortions by the HAS. Echo hiding is more robust against signal processing operations than low-bit coding and is less perceptible than low-bit coding. However, the relatively low data rate supported by echo hiding, often around 50 bits per second, does not necessarily render it suitable for acoustic data transmission.

Spread spectrum hiding applies a spread spectrum technique to communicate data over an acoustic channel, including auditory masking to hide desired information. Messages are embedded in the frequency domain as noise in the form of pseudorandom sequences that depend on the properties of the carrier signal. Models of the HAS are used to intelligently spread the message in the frequency domain so that it is covered by features of the host signal and the hidden information becomes almost inaudible. Furthermore, spread spectrum coding provides robustness against noise and distortions and may offer a bit rate of about 200 bits per second in case of acoustic data transmission.

In phase coding, the phases of audio signals are altered in specific ways to embed hidden messages. In a respect similar to echo hiding and spread spectrum hiding, phase coding attempts to exploit knowledge about the properties of the HAS to render the hidden information inaudible. The phases in audio signals may be manipulated because the human ear is not sensitive to phase changes and can typically only sense relative but not absolute phases. In some embodiments, a data hiding algorithm may be used to transmit audio signals with hidden messages over a distance of one to three meters and with an error rate of about ten percent and a bit rate of several hundred kilobits per second. In addition, the distortions introduced to the host signal are virtually imperceptible. Accordingly, at least some embodiments herein describe a data transmission system that is based on phase coding techniques.

To embed data into an audio signal using phase coding, the signal is transformed to the frequency domain. In this domain, the amplitude and the phase of the signal can be altered to encode information. It may not necessarily be desirable to transform the audio signal as a whole, e.g., using a Fourier transform. In the case of a song or a movie soundtrack, computing a single, large Fourier transform leads to a frequency representation of the signal with a fine-grained frequency resolution. However, the time resolution would be low, because the resulting spectrum represents the signal over the whole duration of the audio signal. Thus, there is only a single sample of the frequency spectrum on the time axis. Accordingly, a Time-Frequency Representation (TFR) of the signal is needed to change the phases at different frequencies and times. TFRs are used to analyze the sinusoidal frequency and phase content of local sections of a signal as it changes over time. To compute a TFR, the signal has to be partitioned into equally sized blocks of samples and transformed block by block to the frequency domain. For each block, the TFR yields a set of sub-bands (frequency bins) that describes the corresponding frequency spectrum. The size of a block influences the time and frequency resolution of the TFR. Large blocks lead to a high frequency resolution at the expense of a low time resolution. Small blocks cause the opposite: a low frequency but a high time resolution. The optimal block size is a compromise between the two and highly depends on the specific application of a TFR. A common example of a TFR is the spectrogram of an audio signal. Spectrograms visualize the frequency spectrum of sound over time and are used in speech processing, seismology and many other scientific areas.

In one embodiment, a TFR is computed by a Short-Time Fourier Transform (STFT), as follows:

$$X_m(\omega) = \sum_{n=-\infty}^{\infty} x(n) w(n-mR) e^{-j\omega n} \quad \text{(Equation 1)}$$
$$= DTFT_\omega(x(n) \cdot S_{HIFT_{mR,n}}(w)),$$

where
ω=Angular frequency in radians per second
x(n)=n-th sample of the input signal, n∈ℤ
w(n)=Length M window function, typically M∈[32, 64, ..., 4096]
R=Hop-size in samples
j=imaginary unit ($\sqrt{-1}$)

$$DTFT_\omega(x) = \sum_{n=-\infty}^{\infty} x(n) e^{-j\omega n},$$

the Discrete Time Fourier Transform
$SHIFT_{\Delta,n}(x)=x(n-\Delta)$, $\Delta \in \mathbb{Z}$, the shift operator
$X_m(\omega)$=DTFT of windowed data centered about time mR. If the window w(n) has a Constant OverLap-Add (COLA) property at hop-size R, i.e., if $$\sum_{n=-\infty}^{\infty} w(n-mR) = 1, \forall n, m \in \mathbb{Z} \ (w \in COLA(R)), \quad \text{(Equation 2)}$$

Than the sum of the successive DTFTs over time equals the DTFT of the whole signal:

$$\sum_{m=-\infty}^{\infty} X_m(\omega) \triangleq \sum_{m=-\infty}^{\infty} \sum_{n=-\infty}^{\infty} x(n) w(n-mR) e^{-j\omega n} \quad \text{(Equation 3)}$$
$$= \sum_{n=-\infty}^{\infty} x(n) e^{-j\omega n} \underbrace{\sum_{m=-\infty}^{\infty} w(n-mR)}_{1 \text{ if } w \in COLA(R)}$$
$$= \sum_{n=-\infty}^{\infty} x(n) e^{-j\omega n}$$
$$\triangleq DTFT_\omega(x) = X_\omega.$$

It follows that the Inverse STFT (ISTFT) is the Inverse DTFT (IDTFT) of this sum:

$$x(n) = IDTFT_\omega \left\{ \sum_{m=-\infty}^{\infty} X_m(\omega) \right\} \quad \text{(Equation 4)}$$
$$= \sum_{m=-\infty}^{\infty} IDTFT_\omega \{X_m(\omega)\}$$
$$= \sum_{m=-\infty}^{\infty} x_m(n),$$

where $$IDTFT_\omega(X) = \frac{1}{2\pi} \int_{-\pi}^{\pi} X(\omega) e^{j\omega n} d\omega = x(n).$$

Thus, after applying the inverse STFT, the resulting blocks can be overlap-added to reconstruct the original signal in the time domain. At least in some embodiments, the STFT can be used to perform spectral manipulation of an audio signal in the frequency domain. In practical implementations of the STFT, the DTFT is replaced by a Discrete Fourier Transform (DFT) or a Fast Fourier Transform (FFT). In contrast to the DTFT, which operates on sampled signals defined over all integers n∈ℤ, the DFT operates on sampled signals of length N. Therefore, unlike the DTFT, the DFT is a function of discrete frequency $\omega_k = 2\pi f = 2\pi k/N$, $k \in [0, N-1]$ and can be defined as:

$$X_m(\omega_k) \triangleq \sum_{n=0}^{N-1} x(n)e^{-j\omega_k n} \quad \text{(Equation 5)}$$

The FFT is an efficient algorithm with which to compute the DFT and its inverse. At least in some embodiments, the FFT requires the length of the input signal to be a power of two, and the lengths may often be in the range between 32 and 4096. Calculating the FFT of a signal with length N has a complexity of O(N log(N)). An STFT with block size M and hop size R=M (non-overlapping blocks) leads to N/M FFT computations of size M. This results in a complexity of O((N/M) M log(M))=O(N log(M)). It follows that the smaller the block size, the faster the STFT computation executes. However, as mentioned above, because the block size influences time and frequency resolution, the block size is not to be arbitrarily chosen.

Figure 3:
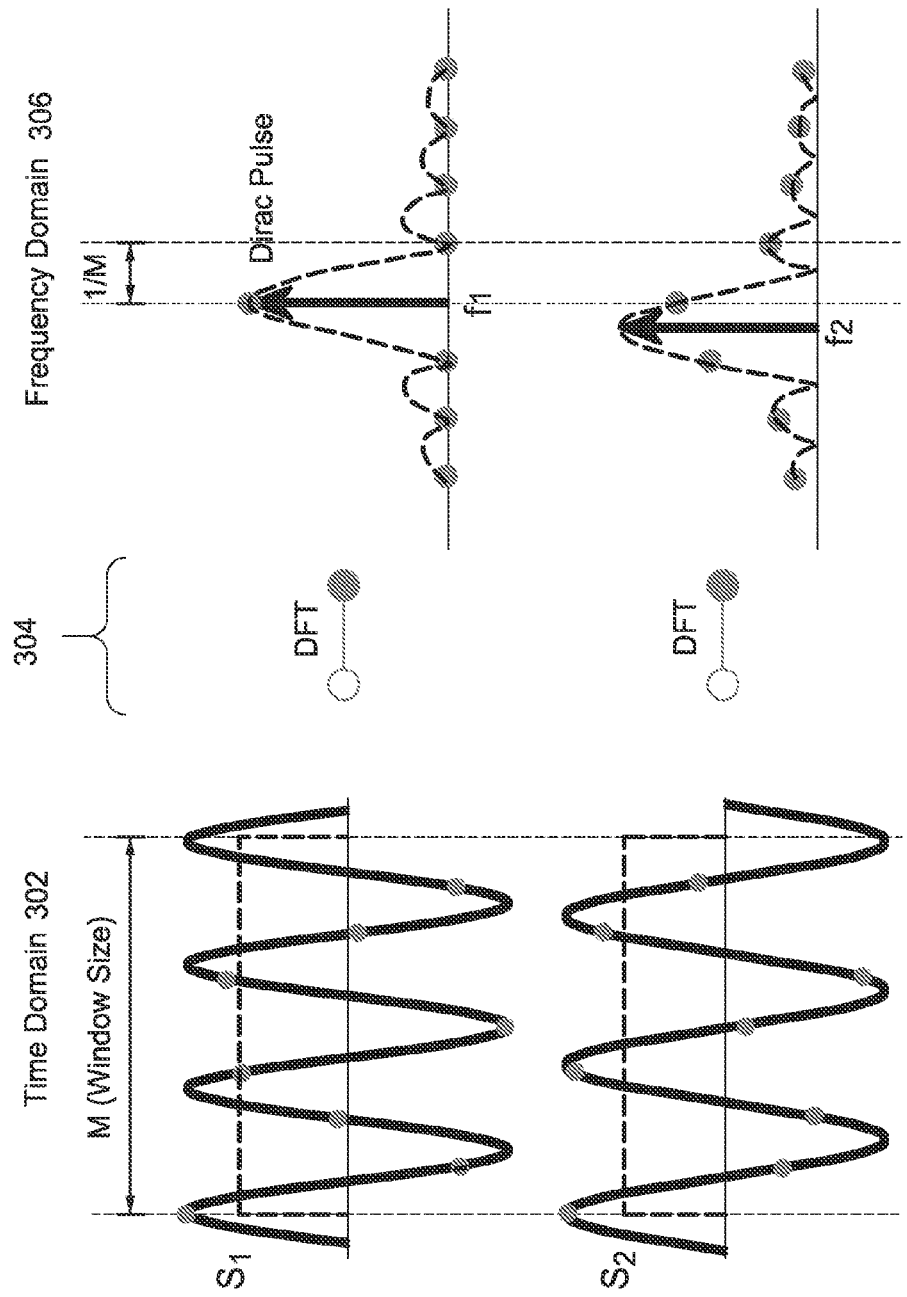
FIG. 3 is a diagram illustrating sampled and windowed sine waves and corresponding Discrete Fourier Transforms (DFTs), according to one embodiment presented in this disclosure.

FIG. 3 is a diagram 300 illustrating sampled and windowed sine waves and corresponding DFTs 304, according to one embodiment presented in this disclosure. In particular, two sine waves $s_1$ and $s_2$ are windowed using a rectangular window and transformed to the frequency domain using DFTs 304. At least in some embodiments, computing the STFT using a rectangular window (w(n)=1/M) can lead to a large amount of spectral leakage. Note that the window size M is a multiple of the period of the upper sine wave $s_1$. Further, sine wave $s_2$ has a longer period than sine wave $s_1$. Therefore, the frequency $f_2$ associated with the sine wave $s_2$ is lower than the frequency $f_1$ associated with the sine wave $s_1$. This can also be seen in reference to the Fourier transform, which for sine waves is given by a Dirac pulse at a corresponding frequency in the frequency domain 306. The Fourier transform of the rectangular window function is a sin c function. This function is defined as:

$$\text{sinc}(x) = \frac{\sin(\pi x)}{\pi x}. \quad \text{(Equation 6)}$$

The convolution theorem states that applying a Fourier transform to a product of two signals in the time domain 302 gives the same result as transforming each signal individually and then computing a convolution therebetween. In mathematical terms:

$$\mathcal{F}\{x(t) \cdot y(t)\} = \mathcal{F}\{x(t)\} * \mathcal{F}\{y(t)\}, \quad \text{(Equation 7)}$$

where x(t) and y(t) are signals and where * denotes the discrete convolution operator defined as follows:

$$(x * y)[n] \triangleq \sum_{n=-\infty}^{\infty} x(m)y(n-m), n \in \mathbb{Z}. \quad \text{(Equation 8)}$$

Hence, the Fourier transform of the product between a rectangular window and a sine wave is equal to the convolution between the corresponding sin c function and the corresponding Dirac pulse. Referring again to FIG. 3, this convolution shifts the peak of the sin c function to the location of the Dirac pulse. In the case of sine wave $s_1$, this has the effect that all the zero-crossings of the sin c function are aligned perfectly with the discrete sampling grid of the DFT. Therefore, the DFT spectrum of the windowed signal of $s_1$ contains a single peak at frequency $f_1$, while all the other frequency bins contain zeros. On the other hand, windowing and transforming $s_2$ yields a different result. The zero-crossings of the sin c function are not aligned with the sampling grid. For this reason, the DFT spectrum has spectral leakage, meaning that it contains frequencies that are not present in the signal of $s_2$ but that are artifacts caused by the rectangular window. These artifacts can also be explained in reference to the two signals in the time domain. A signal that is transformed using a DFT is assumed to be periodic. Periodic repetition of the windowed version of $s_1$ results in an infinite sine wave with frequency $f_1$. However, windowing and periodically repeating $s_2$ does not necessarily lead to a sine wave.

Figures 4, 5:
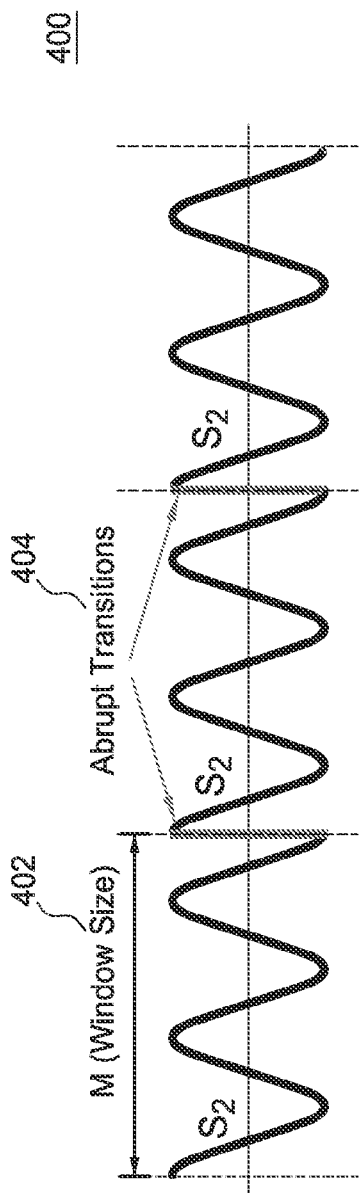
FIG. 4 is as diagram illustrating periodic repetition of a windowed sine wave, according to one embodiment presented in this disclosure.
FIG. 5 is a table comparing Bit Error Rates (BER) between Short-Time Fourier Transform (STFT) and Modulated Complex Lapped Transform (MCLT), according to one embodiment presented in this disclosure.

FIG. 4 is as diagram 400 illustrating periodic repetition of a windowed sine wave, according to one embodiment presented in this disclosure. As the diagram 400 shows, windowing and periodically repeating $s_2$ does not lead to a sine wave. Abrupt transitions at the borders of a block leak spectral energy into high-frequency coefficients of the DFT spectrum. Therefore spectral leakage is often referred to as blocking artifacts. Window functions that smoothly decay to zero at their borders are used to avoid blocking artifacts. Applying a smooth window such as the Hamming window to a signal takes care of abrupt transitions at the borders. When the hop-size equals the block size of the STFT (R=M), for the rectangular window r(n) the COLA property r c COLA(R) holds. This is not the case for the Hamming window h(n). However if R=M/2 (fifty percent overlap), h∈COLA(R) holds, which allows for perfect reconstruction of the signal. Using a fifty percent overlap means that 2*M samples are needed to reconstruct a block of length M. This is referred to as non-critical sampling or oversampling. In case of a fifty percent overlap, each sample is used twice in the computation of the STFT. Therefore, the complexity for transforming a signal with length N using a block size of M increases from O(N log(M)) to O(2*N log(M))). The larger complexity is the cost of non-critical sampling to avoid spectral leakage.

In one embodiment, the Modulated Lapped Transform (MLT) uses a fifty percent overlap (R=M/2) to avoid blocking artifacts. In contrast to the STFT, the MLT is critically sampled. Transforming a block of length M therefore leads to only M/2 spectral coefficients. Thus, a single block can never be perfectly reconstructed. However, the MLT applies Time Domain Aliasing Cancellation (TDAC) to enable perfect reconstruction of the entire signal. When overlap-adding the blocks resulting from an inverse MLT, TDAC causes the errors introduced by the transform to cancel out. The basis functions of the MLT are defined as:

$$p_{MLT}(n, k) = w(n)\sqrt{\frac{2}{M}} \cos\left[\left(n + \frac{M+1}{2}\right)\left(k + \frac{1}{2}\right)\frac{\pi}{M}\right], \quad \text{(Equation 9)}$$

where $$w(n) = -\sin\left[\left(n + \frac{1}{2}\right)\frac{\pi}{2M}\right], (w^2 \in COLA(M)), \quad \text{(Equation 10)}$$

is both the analysis and synthesis window. In contrast to the STFT, the MLT uses not only an analysis window but also a synthesis window in its corresponding inverse transform. Thus, to achieve a perfect reconstruction of the signal, in case of the MLT, not w(n) but $w^2(n)$ is to obey the COLA requirement for the hop size M defined in Equation 2.

In one embodiment, introducing a synthesis window is useful because the synthesis window tapers distortions introduced by modifications of the frequency content off to zero. This property makes the MLT a suitable transform for a phase coding application according to embodiments disclosed herein. However, two problems arise. First, the MLT does not contain phase information, and second, spectral modifications unbalance the time domain aliasing components, which results in un-canceled time domain aliasing in the reconstructed signal, despite TDAC.

In one embodiment, the Modulated Complex Lapped Transform (MCLT) incorporates phase content and does not suffer from time domain aliasing, because it is oversampled. The MCLT can be viewed as an MLT extended with additional sine-modulated functions, which results in a 2× oversampling in the frequency domain. In other words, the MCLT computes a complex frequency component for each real-valued input sample. The MCLT is therefore similar to an STFT with fifty percent overlap. However, the basis functions of the MCLT are different and may provide fewer artifacts than the STFT (or other basic DFT filter banks) when transforming audio signals, especially in case of manipulations in the frequency domain. Accordingly, at least some embodiments are described herein in conjunction with using MCLT rather than STFT to compute time-frequency representations. The basis functions of the MCLT are given by:

$$p_{MCLT}(n, k) = w(n)\sqrt{\frac{2}{M}} \exp\left[-j\left(n + \frac{M+1}{2}\right)\left(k + \frac{1}{2}\right)\frac{\pi}{M}\right]. \quad \text{(Equation 11)}$$

The analysis and synthesis window w(n) is the same as the one used for the MLT defined in Equation 10. The forward MCLT is defined as follows:

$$X_m(k) = \sum_{n=0}^{2M-1} x_m(n)p_{MCLT}(n, k). \quad \text{(Equation 12)}$$

where k=0, 1, . . . , M−1 is the frequency index, M is the hop size, and 2M is the block size. Further, $x_m(n)$ is the m-th block of the signal in the time domain, and $X_m(k)$ is the corresponding block in the frequency domain. The Inverse Modulated Complex Lapped Transform (IMCLT) is given by:

$$y_m(n) = \sum_{k=0}^{M-1} X_m(k)p_{MCLT}(n, k), \quad \text{(Equation 13)}$$

where $y_m(n)$ is the reconstruction of the m-th block of the signal.

As discussed above, the MCLT provides fewer artifacts than the STFT where spectral modifications are performed in the frequency domain. To find out if this holds true for the type of frequency domain manipulations involved in phase coding, the two transforms were compared using the acoustic data transmission system described herein. A pseudorandom bit sequence was embedded into a carrier file. Then, the carrier was played back over a high quality speaker and recorded with a professional studio microphone at a one-meter distance from the speaker. After this transmission over the acoustic channel, the data was extracted again and compared to the originally embedded bit sequence in terms of Bit Error Rate (BER), the percentage of erroneously transmitted bits. This experiment was repeated five times for each type of transform.

FIG. 5 is a table 500 comparing BER between STFT and MCLT, according to one embodiment presented in this disclosure. As shown, results 502 of the experiment are given in the form of percentages and rounded to two decimals. Standard deviations 504 and averages 506 are also included in the table 500. The table 500 indicates that MCLT provides superior results to the STFT in terms of BER. Further, when listening to the audio files processed with the MCLT, fewer distortions and annoyances were audible than for the sound files processed with the STFT. Based on the outcome of this evaluation and subjective listening tests, MCLT rather than STFT is used in for the acoustic data transmission system according to at least some embodiments described herein.

One embodiment provides a data hiding technique for acoustic data transmission based on phase coding. Because the data hiding technique is to be configured for at least movie theater and home entertainment applications, specific requirements are involved. Movie theaters tend to have acoustic properties such as good frequency balance, sound projection and favorable reverberation times. The sound systems used in cinemas most often follow high quality standards. Thus, movie theaters offer beneficial conditions for acoustic data transmission. Another factor to consider is imperceptibility. For at least movie theater and home entertainment applications, it is desirable that the hidden information contained in a signal remains inaudible to the human ear. It may be possible to achieve an improvement in sound quality by decreasing the bandwidth. In the cinema communication application, that a content provider has control over the signal, e.g., the movie soundtrack, can be exploited and adapted in favor of imperceptibility of the audio hiding techniques being used.

Figure 6:
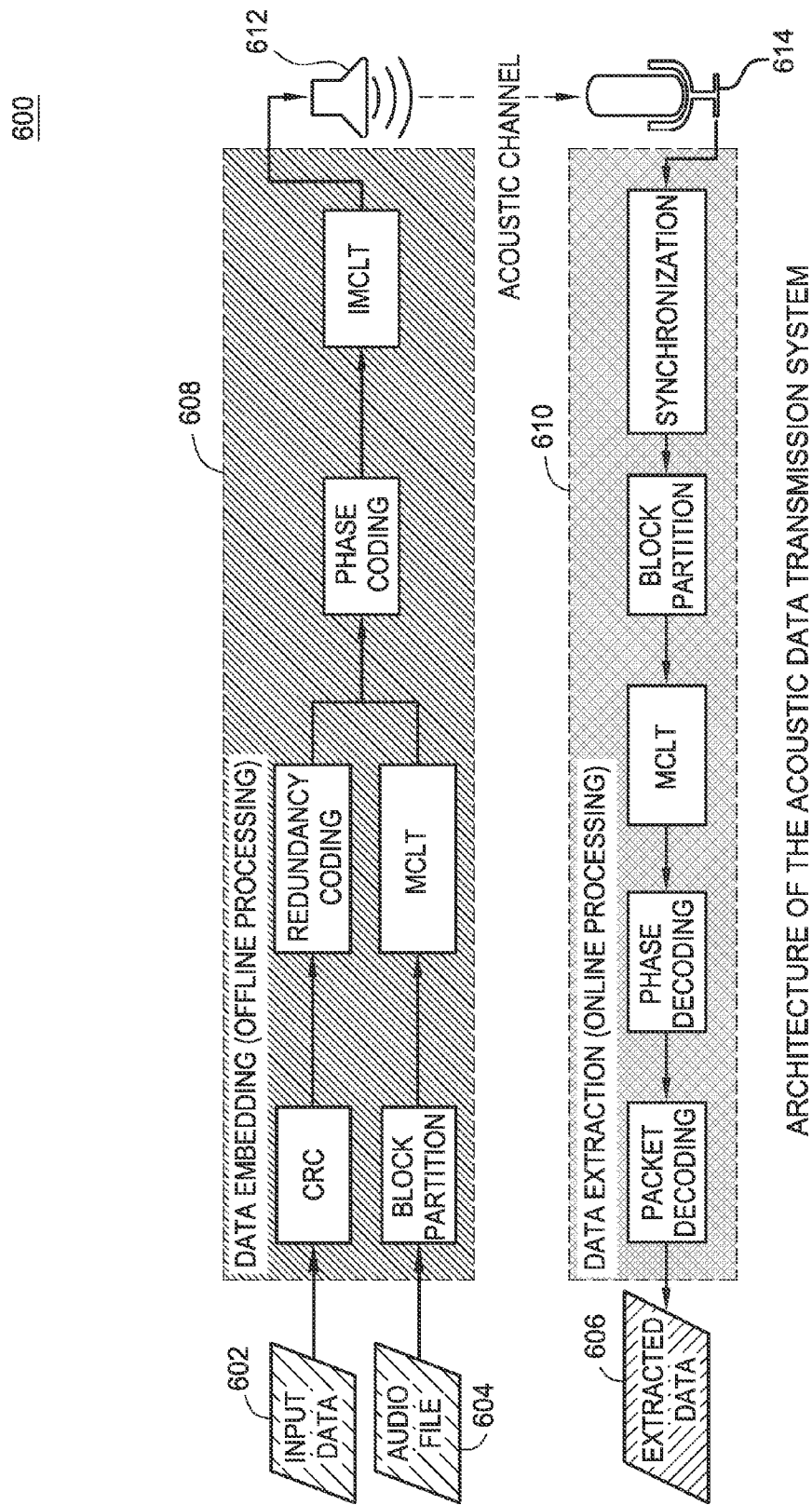
FIG. 6 is a diagram showing an architecture and control flow between different modules of an acoustic data transmission system, according to one embodiment presented in this disclosure.

FIG. 6 is a diagram 600 showing an architecture and control flow between different modules of an acoustic data transmission system, according to one embodiment presented in this disclosure. The acoustic data transmission system involves encoding input data 602 into an audio file 604, playing the resulting audio file via a speaker 612, detecting audio via a microphone 614, and generating extracted data 606 based on the detected audio, where the extracted data 606 corresponds to the input data 602. In one embodiment, the control flow is divided into two principal parts: the data embedding stage 608 and the data extraction stage 608, and each module is associated with its own sub-stage. In the data embedding stage, the audio file 604 is divided into equally sized blocks in a Block Partition sub-stage and transformed to the frequency domain using MCLT. The input data, which is an arbitrary stream of bits, e.g., a text message, is wrapped into packets of equal size. These packets contain a redundancy encoded version of the input bits as well as an error detection code, e.g., Cyclic Redundancy Code (CRC). The resulting data is embedded in the carrier signal in a Phase Coding sub-stage. After that, the audio signal is transformed back to the time domain in an IMCLT sub-stage and is ready to be played back over a sound system. At least in some embodiments, the data embedding technique is performed offline. As such, the data embedding technique may not necessarily be time-critical or performance-critical, at least relative to the data extraction stage.

In the data extraction stage 610, a receiver in a synchronization sub-stage synchronizes to an input signal coming from the microphone 614. Next, the audio is divided into blocks in a Block Partition sub-stage and again transformed to the frequency domain in an MCLT sub-stage. Then, the hidden bits are extracted from the phase content in a phase decoding sub-stage. Redundancy decoding and the previously embedded error detection codes are used to identify successfully transmitted bits in a Packet Decoding sub-stage. These bits then form the extracted data, which should be identical to the input data. At least in some embodiments, the data extraction process executes in real-time. Accordingly, the input of each module depends on the output of its predecessor and is to finish within a given time period, so that the next chunk of input data may be successfully processed.

In one embodiment, phase coding is used to embed the data to be transmitted into the phase content of the audio file that acts as the carrier signal. As discussed above, the MCLT (Equation 12) is used to get a time-frequency representation of an audio signal. Transforming a block of 2M real-valued audio samples results in M complex-valued MCLT coefficients. These coefficients represent the amplitude and phase at M sub-bands, which are equally distributed over the frequency spectrum. After altering the phase content to resemble the data to be hidden, each MCLT block is transformed back to the time domain applying the IMCLT defined in Equation 13 and overlap-adding the resulting blocks. This results in an audio file which sounds nearly the same as the unedited carrier signal. The embedded data is inaudible to the extent that the human ear cannot distinguish the two signals. The processed audio file can then be played back over a speaker and recorded with a microphone at a receiver, e.g., a smartphone. The receiver transforms the incoming audio signal block by block into the MCLT domain and decodes the embedded data after synchronization, which is described in further detail below.

In one embodiment, data is only embedded in a certain range of the spectrum. The range is a parameter that may be selected arbitrarily but has to be known at the receiver. In some embodiments, the acoustic data transmission system may optionally allow the frequency range to change dynamically over time. Frequencies between one and ten Hertz may be used, because such frequencies are likely to be present in music or movie soundtracks and thus provide a better link quality. This is because embedding data is facilitated where there is energy in the selected spectrum; embedding bits into silence may not be feasible. The frequency range determines the number of sub-bands M. The number of sub-bands then defines how many bits per audio block can be embedded. Before encoding, each bit is translated to a spreading code consisting of multiple symbols to decrease the probability of transmission errors. The length K of the spreading codes, described in further detail below, also has an influence on the maximum number of embedded bits per block. In general, the number of bits per block is equal to M/K and the number of sub-bands M is chosen to be a multiple of the code length K. The number of bits per block multiplied by the number of blocks per second, determines the bit rate of the acoustic data transmission system. The bit rate is approximately 500 bits per second for typical parameters.

In one embodiment, spreading codes are used in spread-spectrum radio communication to allow multiple channels to operate on the same spectrum. They can be defined as finite sequences of code symbols from an alphabet given as the set C:

$$\{c(k)\}_{k=0}^{K-1} = \{c(0), c(1), \ldots, c(K-1)\}, \quad \text{(Equation 14)}$$

where K is the code length and $c(k) \in C$. Note that function notation, e.g., $c(k)$ instead of $c_k$, is used for sequences to improve readability of formulas with complicated indexing. In one embodiment, spreading codes provide redundancy that reduces the probability of bit errors in the acoustic data transmission technique. Instead of embedding one data bit per frequency, it may be more reliable to add redundancy by spreading a single bit over different, adjacent frequencies. The longer the spreading codes are, the more redundancy is added and the lower the channel bandwidth becomes. For instance, for a code length of K=4 and the alphabet of code symbols C={−1, 1}, the following mapping from bits to binary spreading codes may be used:

$$1 \mapsto c_{one}(k) = \{1, -1, 1, -1\}$$

$$0 \mapsto c_{zero}(k) = \{-1, 1, -1, 1\} \quad \text{(Equation 15)}$$

In one embodiment, before data is embedded, the data is translated bit by bit to a binary spreading code sequence using a mapping such as shown in Equation 15. The resulting sequence is a concatenation of the codes $c_{one}(k)$ and $c_{zero}(k)$ and thus solely consists of the two spreading code symbols 1 and −1. Hence, the resulting sequence is another finite sequence of code symbols given by:

$$\{s(n)\}_{n=0}^{N-1} = \{s(0), s(1), \ldots, s(N-1)\}, \quad \text{(Equation 16)}$$

where $s(n) \in C = \{-1, 1\}$, N is the total length of the sequence, and N/K is the number of spreading codes $c_{one}(k)$ and $c_{zero}(k)$ it contains. Further, s(n) can be modulated symbol by symbol into the phase content of the carrier signal.

In the theoretical scenario of an error-free channel, the result of the extraction process at the receiver is the exact same sequence of spreading code symbols that was embedded before transmission. However, an analog channel from a speaker to a microphone in practice contains certain amounts of noise and thus may not necessarily be error free. Accordingly, the resulting extracted symbols may be slightly different. The extracted symbols may be defined as:

$$\{r(n)\}_{n=0}^{N-1} = \{r(0), r(1), \ldots, r(N-1)\}, \quad \text{(Equation 17)}$$

where $r(n) \in [0, 1]$. The only difference compared to Equation 16 is that r(n) can contain arbitrary values in the range [−1, 1], instead of only 1 and −1. These values can be interpreted as follows: the closer a value is to −1 or 1, respectively, the more likely the value represents the corresponding spreading code symbol. If a value is 0, the value tends neither to the −1 nor to the 1 symbol. To decode the hidden data, a sequence of extracted symbols r(n) is mapped back to 0 and 1 bits. To that end, equally sized sub-sequences of length K are cross-correlated with $c_{one}(k)$, the spreading code for the 1-bit. K is the code length, which is the number of symbols in $c_{one}(k)$ and $c_{zero}(k)$. The result is a sequence of correlation coefficients ρ(n) which is defined as:

$$\rho(n) = \frac{1}{K} \sum_{k=0}^{K-1} r(nK+k) c_{one}(k) \quad \text{(Equation 18)}$$

where n=0, 1, . . . , M−1. M is equal to the length of the embedded bit sequence representing the original message. For a sequence of extracted values r(n) with length N and a code length of K, M=N/K. Note that $c_{zero}(k)$ is to be the negation of $c_{one}(k)$, for p(n) to be meaningful. If a correlation coefficient ρ(n)≥0, the decoded bit is 1; otherwise if ρ(n)<0, the received code better correlates with $c_{zero}(k)$, in which case the decoded bit is 0. Further, the larger the value of |ρ(n)|, the stronger its correlation with the corresponding spreading code, and the lower the probability of a decoding error.

Figure 7:
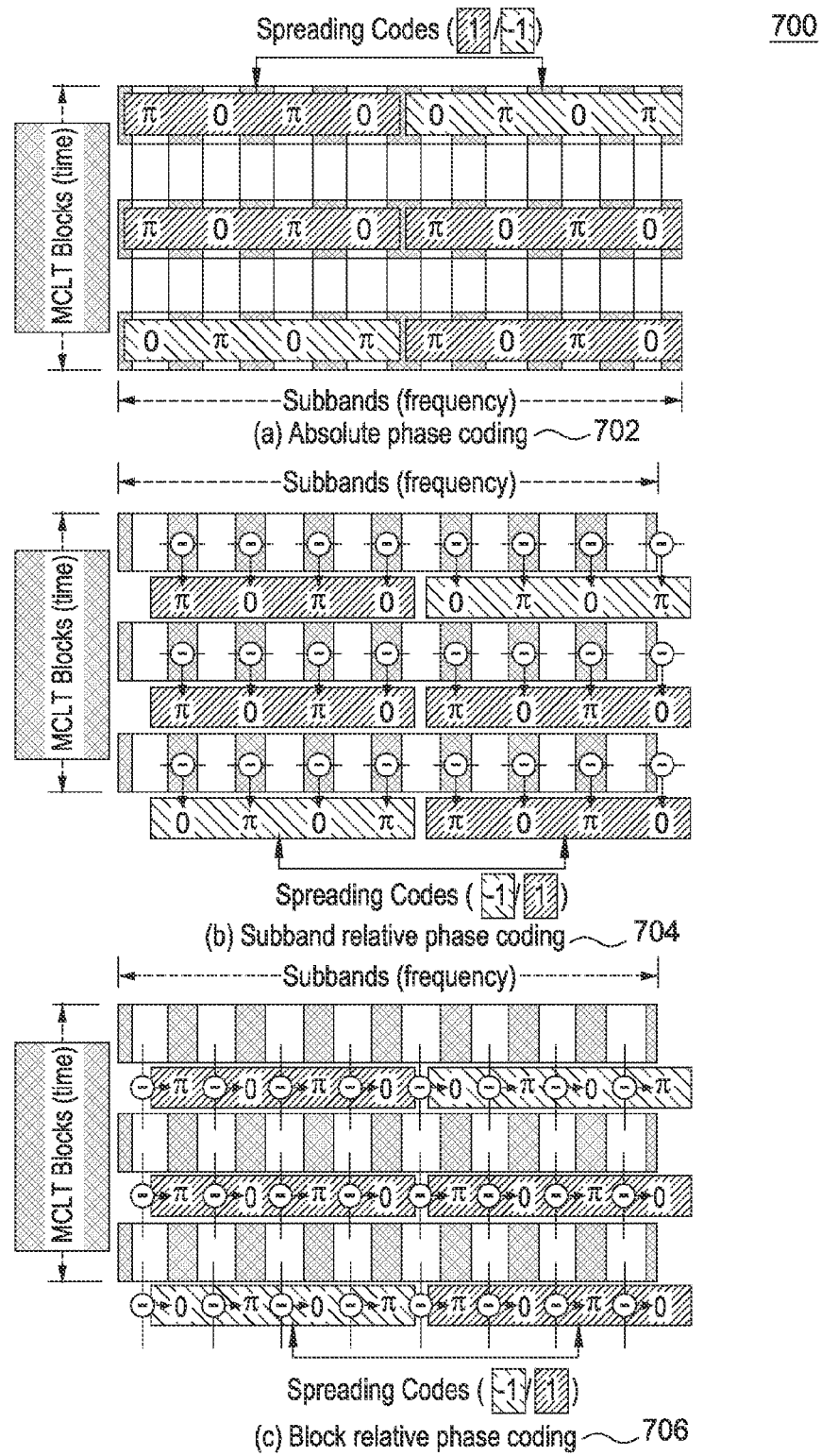
FIG. 7 is a diagram illustrating phase coding in the MCLT domain with blocks, sub-bands and spreading codes, according to one embodiment presented in this disclosure.

FIG. 7 is a diagram 700 illustrating phase coding in the MCLT domain with blocks, sub-bands and spreading codes as defined in Equation 15, according to one embodiment presented in this disclosure. In one embodiment, to embed the spreading code symbols 1 and −1 into the phase content received from the MCLT, a variety of techniques may be used, examples of which include absolute phase coding 702, sub-band relative phase coding 704, and block relative phase coding 706. In absolute phase coding 702, the phases are altered so that the spreading code symbol 1 is represented by a phase of 0 and so that the symbol −1 is represented by a phase of π. The magnitudes of the MCLT coefficients remain unchanged. Hence, the complex MCLT coefficients are not scaled but merely rotated to resemble the corresponding spreading code symbol. This technique is the basis of a modulation scheme referred to as Phase-Shift Keying (PSK) in digital communication.

For simplicity of notation in the following equations, it is assumed that all of the sub-bands of an MCLT block are used for data embedding. However, often in practice, only a limited range of sub-bands is used, because embedding data over the whole frequency spectrum introduces audible distortions in the audio file. The following equations can be translated to use only a certain range of sub-bands by adapting the indexing for the variable m. Absolute phase coding is defined as follows:

$$X_{i,m}' = |X_{i,m}| s(iM+m), \quad \text{(Equation 19)}$$

where i=0, 1, . . . , N−1 with N=number of MCLT blocks m=0, 1, . . . , M−1 with M=number of subbands per block $X_{i,m}$=Original phase at m-th subband of i-th MCLT block $X_{i,m}'$=Modified phase at m-th subband of i-th MCLT block $s(n) \in \{-1, 1\}$=Sequence of code symbols representing the data to be embedded.

In one embodiment, by computing the absolute value of an MCLT coefficient, its phase is shifted to 0. Negating the absolute value (if s(n)=−1) causes a phase shift of π. Therefore, the resulting coefficients have a phase of either 0 or π. In both cases, their imaginary parts have vanished. To embed data represented as a sequence s(n) of concatenated spreading codes $c_{one}(k)$ and $c_{zero}(k)$, start with the first sub-band of the first transformed audio block, then continue with the second sub-band, and so forth. Once all sub-bands of an MCLT block have been processed, continue with the first sub-band of the next block, which procedure is illustrated in FIG. 7.

Figure 8:
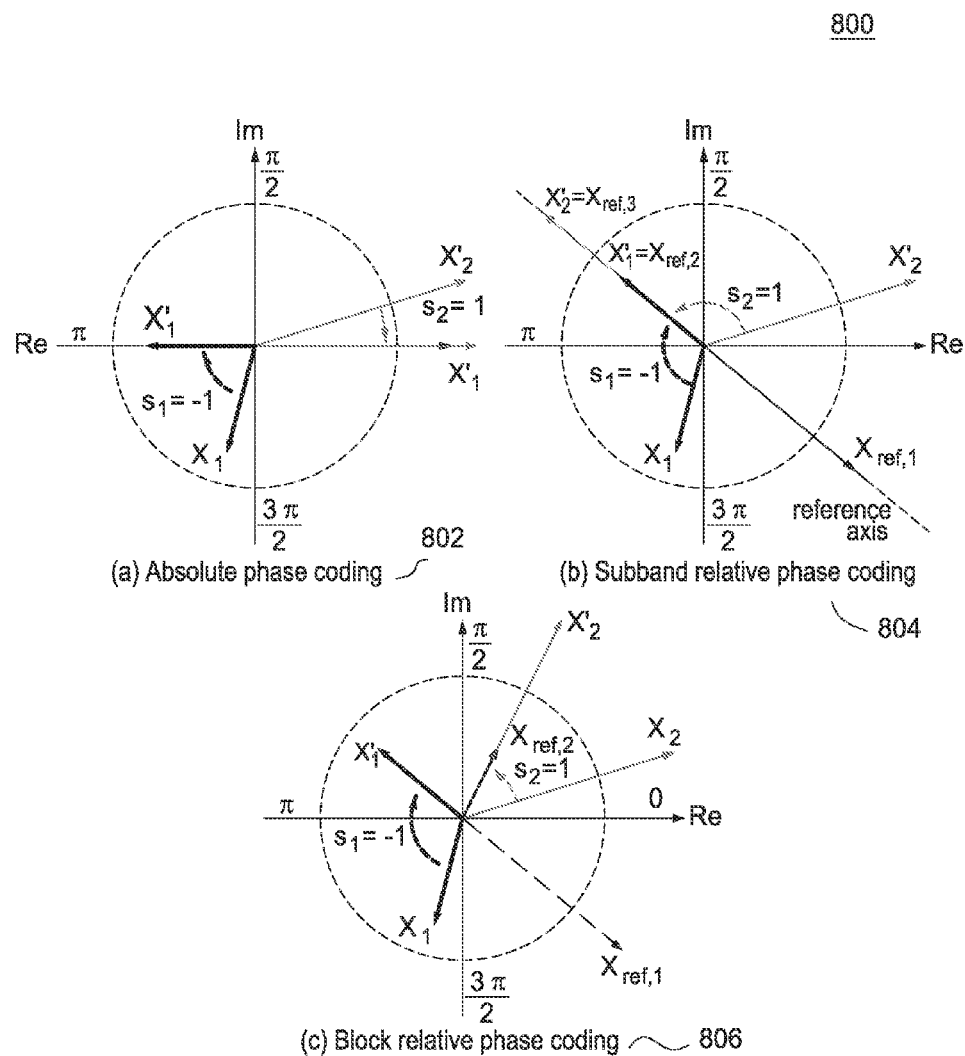
FIG. 8 illustrates a complex plane representation of phase coding in the MCLT domain, according to one embodiment presented in this disclosure.

FIG. 8 illustrates a complex plane representation 800 of phase coding in the MCLT domain, according to one embodiment presented in this disclosure. The complex plane representation 800 includes representations for absolute phase coding 802, sub-band relative phase coding 804, and block relative phase coding 806, respectively. As shown, two MCLT coefficients X1 and X2 are modified in the complex plane via absolute phase coding to embed the two symbols −1 (X1) and 1 (X2). Note again that because the coefficients are not scaled but merely rotated in the complex plane, the amplitude of the audio signal remains the same. In order to decode the embedded data, the receiver analyzes the phase content in the MCLT domain. The phases of the sub-bands used for phase coding are extracted and normalized to produce a sequence r(n) of the form of Equation 17. For an MCLT coefficient $X_{i,m}$, this is achieved by the following formula:

$$r(iM + m) = -2\left(\frac{|\text{angle}(X_{i,m})|}{\pi} - 0.5\right), \quad \text{(Equation 20)}$$

where $\text{angle}(x) = \text{atan2}(\text{Im}(x), \text{Re}(x))$

-continued $$\text{atan2}(y, x) = \begin{cases} \arctan\left(\frac{y}{x}\right) & x > 0 \\ \arctan\left(\frac{y}{x}\right) + \pi & y \leq 0, x < 0 \\ \arctan\left(\frac{y}{x}\right) - \pi & y < 0, x < 0 \\ +\frac{\pi}{2} & y > 0, x = 0 \\ -\frac{\pi}{2} & y < 0, x = 0 \\ \text{undefined} & y = 0, x = 0. \end{cases}$$

Note, a tan 2(y, x) is a common variation of the arctan function that yields values in the range of [−π, π] and that can be used to compute the phase (angle) of a complex number. Because only the angular distance of the extracted phases to 0 and π is desired, the corresponding magnitudes are computed and mapped into the range of [0, π], as shown by the angles in the complex plane representation for absolute phase coding 802 in FIG. 8. Due to symmetry, a phase of −π/2 has the same angular distance to 0 and π as its absolute value π/2. The same is true for all the phase values on the bottom half of the unit circle.

In one embodiment, to decode the phases, the phases are mapped into the range of spreading codes [−1, 1]. This is achieved by dividing the phases in the range of [0, π] by π, subtracting 0.5 and multiplying by −2. The minus sign comes from the fact that the spreading code symbol 1 is embedded with a phase of 0, whereas π is used for the symbol −1. Therefore, the range is to be inverted. Applying the above steps leads to extracted codes in the form of Equation 17, which can be decoded as described in Equation 18. The phases seen at the receiver depend on the distance between the speaker and the microphone. Because different frequencies have different wavelengths, the phases at the receiver may reflect different shifts depending on the sub-band. Furthermore, the signal that arrives at the receiver often has a time offset that is smaller than a single sample. This cannot be feasibly avoided, because the digital-to-analog converter at the transmitter may not necessarily be in sync with the analog-to-digital converter at the receiver. It is therefore infeasible to decode data embedded using absolute phase coding as soon as it is transmitted over an acoustic channel.

One solution separately apples a k-means clustering algorithm to each sub-band to classify the coefficients into two groups: one cluster for the spreading code symbol 1 (phases closer to 0) and another one for −1 (phases closer to π). Predefined code sequences are periodically transmitted in order for the clustering to operate correctly. Phase shifts can be large, so that a phase close to 0 can be received as a phase close to π at the receiver, and vice versa. A receiver that starts listening to the signal can therefore only correctly decode the data, after the receiver has learned which cluster actually belongs to which spreading code symbol. By transmitting a predefined sequence known to the receiver, clusters can be successfully mapped to spreading code symbols. These predefined sequences are sent in lieu of data bits. Hence, doing so decreases the overall transmission bandwidth of the acoustic data transmission system, and to address this problem, alternative techniques disclosed herein may be used.

At least in some embodiments, in sub-band relative phase coding, desired information is not incorporated into the phases directly but into the differences between phases of two adjacent MCLT sub-bands, also referred to as Differential Phase-Shift Keying (DPSK) in digital communication. Similar to Equation 19, the corresponding formula is given by:

$$X'_{i,m} = \frac{X_{i,m-1}}{|X_{i,m-1}|}|X_{i,m}|s(i(M-1)+m), \quad \text{(Equation 21)}$$

where
- i=0, 1, ..., N−1 with N=number of MCLT blocks
- m=1, 2, ..., M−1 with M=number of subbands per block
- $X_{i,m}$=Original phase at m-th subband of i-th MCLT block
- $X_{i,m}'$=Modified phase at m-th subband of i-th MCLT block
- s(n)∈{−1, 1}=Sequence of code symbols representing the data do be embedded.

Note that the first (0-th) sub-band of each MCLT block is used as a reference only and thus remains unchanged with respect to the original signal. Accordingly, m starts at index 1 instead of 0. M sub-bands can only encode M−1 differences, but such is not necessarily a disadvantage because to compensate, the frequency range used for data embedding can just be extended to incorporate an additional sub-band. The first symbol is encoded in the phase difference between the reference and the second sub-band (m=2). This is achieved by modifying the phase of the second sub-band to differ by an angle of either 0 or π from the phase of the first sub-band. The second symbol is encoded in the phase difference between the second and the third sub-band, and so forth as illustrated in sub-band relative phase coding 704, 804 of FIGS. 7-8.

In one embodiment, for each block, the phase of the first sub-band implicitly defines a reference axis on which all the other phases are to lie. Then, the phases are rotated to either the positive or the negative side of this axis, depending on the symbol to be embedded and the phase of the previous sub-band. As with in absolute coding, the magnitudes of the MCLT coefficients are not altered.

In one embodiment, extraction of the phases at the receiver is performed in a similar fashion as in absolute coding described above, with the formula given by:

$$r(i(M-1)+(m-1)) = -2\left(\frac{\min\{|d_{i,m}|, 2\pi-|d_{i,m}|\}}{\pi} - 0.5\right), \quad \text{(Equation 22)}$$

where
$$d_{i,m} = \text{angle}(X_{i,m}) - \text{angle}(X_{i,m-1})$$

Again, m starts at index 1 because the first sub-band contains a reference phase. Further, $d_{i,m}$ is the phase difference between the current (m) and the previous (m−1) sub-band. To ensure that the smaller of the two possible differences between two phases (inner and outer angle) is used, the minimum of the two is computed. This operation leads to values in the range of [0, π]. The remainder of the calculations is the same as in Equation 20 and as explained above.

Encoding the message into differences between phases helps address the problem of phase shifts described above in conjunction with absolute phase coding. However, as mentioned above, different phase shifts occur on different sub-bands. Therefore the phase shifts affect the difference between the phases of two neighboring sub-bands and might still introduce errors. Because neighboring sub-bands experience similar phase shifts, sub-band relative phase coding is expected to outperform than absolute phase coding but still may not necessarily address the problem completely. A disadvantage of encoding the data in the phase differences is that a single, incorrectly received phase value causes two incorrectly decoded spreading code symbols. Both differences from the erroneous phase $X_{i,m}$ to its neighboring phases $X_{i,m−1}$ and $X_{i,m+1}$ (previous and next sub-band) become incorrect. A burst of n incorrectly received phases results in n+1 incorrectly decoded spreading code symbols. In comparison, when using absolute phase coding with the k-means clustering technique, a sequence of n incorrectly received phases only leads to n incorrectly decoded spreading code symbols.

At least in some embodiments, block relative coding is similar to sub-band relative coding in that desired data is encoded in the differences between phases. However, instead of considering the phase difference between two adjacent MCLT coefficients, the difference between the phases of two corresponding MCLT components of two adjacent audio blocks is instead analyzed, as shown in sub-band relative phase coding 704 and block relative phase coding 706 of FIG. 7. Block relative coding is defined as follows:

$$X'_{i,m} = \frac{X_{i-1,m}}{|X_{i-1,m}|}|X_{i,m}|s((i-1)M+m), \quad \text{(Equation 23)}$$

where
- i=1, 2, ..., N−1 with N=number of MCLT blocks
- m=0, 1, ..., M−1 with M=number of subbands per block
- $X_{i,m}$=Original phase at m-th subband of i-th MCLT block
- $X_{i,m}'$=Modified phase at m-th subband of i-th MCLT block
- s(n)∈{−1, 1}=Sequence of code symbols representing the data do be embedded.

A representation of block relative coding 806 in the complex plane is shown in FIG. 8. The first MCLT block acts as a reference and does not contain any hidden data. Thus, i starts at index 1 in Equation 23. The magnitudes of the MCLT coefficients remain unchanged.

In one embodiment, extraction operates similarly as laid out in Equation 22 but with the distinction that the phase differences $d_{i,m}$ are computed between blocks instead of sub-bands. Accordingly, the corresponding formula is given by:

$$r((i-1)M+m) = -2\left(\frac{\min\{|d_{i,m}|, 2\pi-|d_{i,m}|\}}{\pi} - 0.5\right), \quad \text{(Equation 24)}$$

where
$$d_{i,m} = \text{angle}(X_{i,m}) - \text{angle}(X_{i-1,m}).$$

As discussed above, phase shifts are not necessarily constant over the frequency spectrum. However, the phase shifts are constant over time as long as the acoustic environment or the position of the microphone and the speakers does not change. Accordingly, block relative phase coding can perform well even in the presence of phase shifts and can operate even with a moving receiver. If the motion is slow or small, the extracted phase differences will be correct because only small phase shifts are introduced by such movement. On the other hand, fast motion may often lead to decoding errors, but as soon as the movement ends, the phase differences are correctly received once again. A single, incorrectly received phase may still cause two incorrectly decoded spreading code symbols, however. The differences between an erroneously received phase and its adjacent phases $X_{i−1,m}$ and $X_{i+1,m}$ from the previous and next block would both be incorrect. But because spreading codes are disposed across sub-bands and not across blocks as shown in block relative coding 706 of FIG. 7, a single, incorrectly received phase will not lead to a decoding error. The correlation between the received code and the spreading code is still strong enough to decode the corresponding bit.

After embedding the data and transforming the MCLT blocks back to the time domain, the transformed blocks are overlap-added to generate the final audio signal for transmission. In some embodiments, there may be significant interference among frequency responses of neighboring sub-bands in the MCLT domain. Furthermore, the overlap-add operation mixes the phase content of adjacent blocks. The phase content will no longer be the same, when transforming a synthesized audio file to the MCLT basis again. However, in the case where the phases of only every other block and sub-band are changed, these interferences can be canceled. A correction coefficient $\mu_{i,m}$ is computed based on the previous and next audio block and the neighboring sub-bands of the current coefficient $X_{i,m}$. Further, $\mu_{i,m}$ is defined as follows:

$$\mu_{i,m} = 2j\left[z_{-1,m}^T X_{i-1} + \frac{1}{4}X_{i,m-1} - \frac{1}{4}X_{i,m+1} + z_{1,m}^T X_{i+1}\right], \quad \text{(Equation 25)}$$

where
$X_{i-1}, X_{i+1}$=MCLT coefficient vectors of previous and next MCLT block, respectively
$X_{i,m-1}, X_{i,m+1}$=MCLT coefficients of previous and next subband, respectively $$z_{i,m}(l) = \begin{cases} (-i)\frac{(-1)^{l+k}}{2\pi(2k-1)(2k+1)}, & \text{if } |l-m| = 2k \\ \frac{(-1)^l}{8}, & \text{else if } |l-m| = 1 \\ 0, & \text{otherwise.} \end{cases}$$

Subtracting $\mu_{i,m}$ from the altered phase $X_{i,m}'$ compensates in advance for the interferences to be introduced by neighboring sub-bands and the overlap-add operation. At least in some embodiments, this cancellation technique requires that the adjacent blocks and sub-bands cannot be modified. Because information can only be embedded into every other block and sub-band, four times less information can be transmitted as without the cancellation techniques. This can be compensated for by using a wider frequency range in which data is embedded. A wider frequency range with manipulated phases improves the audibility of the embedded data. However, the effect is not particularly strong, because then only every other sub-band and audio block contains embedded data.

FIG. 9 is a diagram 900 plotting the phase spectrum over time after a random sequence of bits is embedded into the audio content using absolute phase coding with interference cancellation, according to one embodiment presented in this disclosure. As shown in an overview spectrogram 902 of FIG. 9, the phase content has been altered in every other block in the range from 0.6 kHz to 1 kHz. Further, a single-block spectrogram 904 of FIG. 9 zooms in on the plot to show a single block of MCLT phases in the frequency range between 8050 and 8350 Hz. Here, the spreading codes encoded by the phases 0 and π may be observed.

In one embodiment, when recording an audio signal with an embedded message, the receiver first finds the correct partition into blocks in order to next decode the data. If the audio block partition is incorrect, the resulting MCLT blocks will not contain the phases representing the original message. This is due to a time shift causing a phase shift in the frequency domain, which necessitates synchronization.

At least in some embodiments, the size of the blocks is a parameter of the phase coding algorithm that remains constant. Accordingly, if a receiver identifies the correct offset at which a new audio block starts, the receiver can then partition the audio correctly and synchronize to the embedded signal. To find the correct offset, the synchronization algorithm attempts to decode a single block of the signal at each possible offset. Because interference cancellation is used, bits are only encoded into every other block. Thus, for a block length of N, there are 2N offsets to be tested. To determine the correct offset, the synchronization algorithm decodes a single block for each offset k, resulting in a sequence of correlation coefficients $\rho_k(n)$ with length M as defined in Equation 18. For synchronization, the sum of the absolute values of this sequence is desired, which yields a measure of signal strength S(k) as a function of the offset k and given by:

$$S(k) = \frac{1}{M}\sum_{m=0}^{M-1}|\rho_k(m)|. \quad \text{(Equation 26)}$$

At least in some embodiments, the above sum is computed for every offset k=0, 1, 2, . . . , 2N. The maximum signal strength S(q) then indicates the optimal offset q, because at the optimal offset q, $\rho_q(n)$ mostly consists of values close to the spreading code symbols 1 or −1, which leads to a high signal strength S(q). This is not the case at a sub-optimal offset r, where $\rho_r(n)$ mainly contains values close to 0, causing S(r) to be small. The closer k is to the optimal offset, the higher the signal strength, as can be seen when plotting S(k) for k=0, 1, 2, . . . , 2N.

Figure 10:
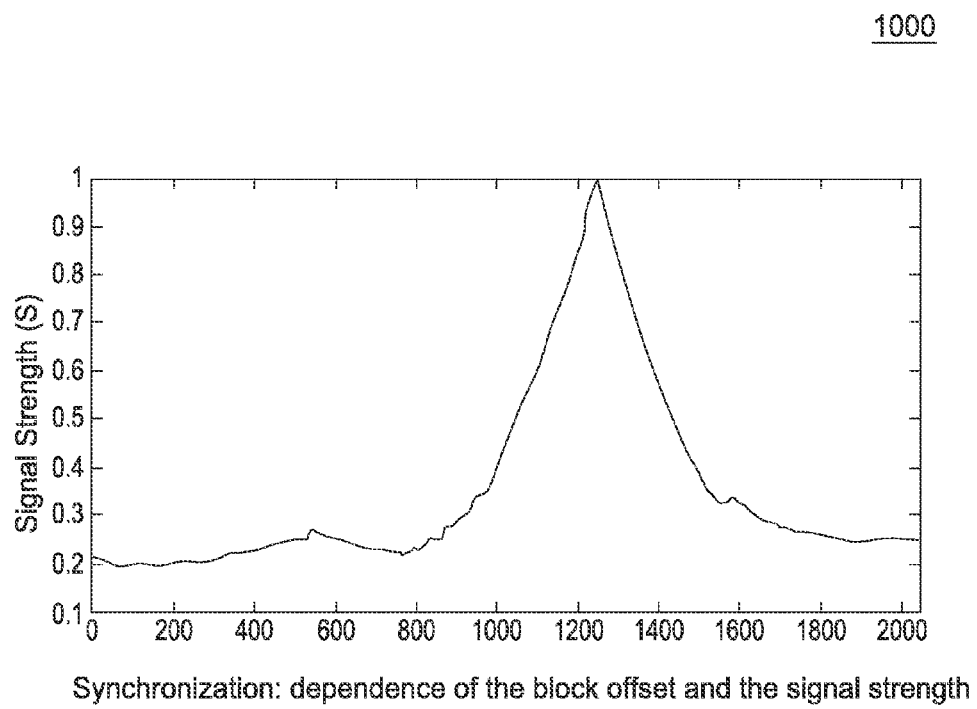
FIG. 10 is a chart showing a continuously increasing signal strength as an offset approaches an optimal offset, according to one embodiment presented in this disclosure.

FIG. 10 is a chart 1000 showing a continuously increasing signal strength once the offset k approaches the optimal offset q at around 1250 samples, according to one embodiment presented in this disclosure. An error free channel (no transmission, direct decoding) and block relative phase coding with a block size of N=1024 samples are used. The reason for this behavior is that time offsets translate to phase shifts in the Fourier (or MCLT) domain. If the time difference to the optimal offset is small, then these phase shifts remain small, which yields high correlation with the spreading codes and thus results in a high signal strength.

In one embodiment, for an error free channel, the optimal offset computed by the synchronization procedure described above yields the correct segmentation of the signal into blocks. However, in practice, fairly quiet audio blocks exist, for which the signal strength is low for every offset, and the maximum does not necessarily yield the optimal offset. Thus, the synchronization algorithm may require the maximum signal strength to be higher than a predefined threshold $\tau_1$. If it is not, the synchronization algorithm is repeated with the next block and continues to repeat, until a maximum signal strength that exceeds $\tau_1$ is found. To increase the probability of determining the correct offset, the synchronization algorithm is executed L−1 times more for all the offsets k that exceeded $\tau_1$ in the first run. Then, the average signal strength of the overall L runs is computed for each offset $k \in \{0, 1, \ldots, 2N | S(k) > \tau_1\}$:

$$\hat{S}_k = \frac{1}{L}\sum_{l=0}^{L-1}\frac{1}{M}\sum_{m=0}^{M-1}|\rho_k(m)|, \quad \text{(Equation 27)}$$

where m, $l \in \mathbb{Z}$ and M is the length of $\rho_k(m)$. The maximum average indicates the optimal offset:

$$\arg\max_k \hat{S}_k.$$

In one embodiment, L is typically a value between 3 and 20, depending on the block size. Because more spreading code symbols can be encoded in the phase content of a large block, the signal strength may be computed with improved accuracy. Hence, not as many iterations of the synchronization algorithm are needed as in the case of blocks with fewer spreading codes.

At least in some embodiments, the acoustic data transmission system does not necessarily require dedicated synchronization codes to be embedded in the audio signal. This is an advantage in that more data bits can be embedded instead. Further, synchronization is feasible at any time, as compared to the case where specific synchronization codes are used, in which a receiver may be required to wait until the next occurrence of such codes in the signal before the receiver can synchronize and begin decoding the embedded data.

In one embodiment, block selection can cause the receiver to attempt synchronization on a part of the audio signal that does not contain any embedded data. If this occurs in the first run of the synchronization algorithm, the signal strength will not exceed the threshold for any of the offsets, and synchronization is restarted using the next block. On the other hand, if it does not occur in the first run, the maximum $\hat{S}_k$ resulting from all L iterations will not necessarily represent the optimal offset. However, the synchronization procedure may just be repeated until $\arg\max_k \hat{S}_k$ surpasses a second predefined threshold $\tau_2$. Both thresholds $\tau_1$ and $\tau_2$ depend on the requirements for a specific application of the acoustic data transmission system.

At least in some embodiment, the reliability of the acoustic channel between a speaker and a microphone strongly depends on the audio content the information is embedded in. It is not feasible to transmit and receive data over such a channel, if the carrier signal is not loud enough or has a limited spectrum. Block selection attempts to improve the link by embedding data only into parts of the audio signal that are expected to work well as a carrier. The audio blocks are analyzed and classified into two groups: strong blocks and weak blocks. The classification is based on properties of the frequency representation of an audio block. An example of such a property is the number of sub-bands for which the magnitude exceeds a predefined threshold. Further, sequences of strong blocks shorter than a given minimum length are also deemed as being weak blocks. Data is only embedded in sequences of strong blocks of a certain length. Such a sequence could be identified at the receiver by a starting delimiter and ending delimiter embedded into its first and last block, respectively.

However, identification of strong blocks at the receiver is not necessarily required. The receiver could alternatively attempt to decode every block and throw away corrupted data. Still alternatively, the receiver could measure the signal strength as defined in Equation 26, from time to time and switch into a duty-cycling mode if the signal strength remains low for a predefined, prolonged period of time. In duty-cycling mode, the receiver periodically decodes just a few blocks each time, checks signal strength, and switches back to normal reception mode if a block contains non-corrupted data. Corruption of data may be determined via cyclic redundancy codes, described in further detail below.

In one embodiment, repetition codes and cyclic redundancy check codes are used to increase reliability of the data link. In combination with spreading codes, doing so provides a form of forward error correction (FEC). Before the data to be embedded is mapped to spreading code symbols and encoded into the phase content of the audio signal, the data is divided into packets of the same size, and redundancy is added to each of these packets.

In one embodiment, fixed packet size P is first defined, which is a multiple of the number of bits that can be embedded in a single block. As discussed earlier, the number is given by M/K, with M being the number of sub-bands per MCLT block used for data embedding, and K being the spreading code length. By setting P=M/K, each packet fits into a single MCLT block. This has the advantage that no delimiters are needed to mark the beginning and the end of a packet. However, larger packet sizes may be required by certain techniques, such as the diversity techniques discussed in further detail below. In one embodiment, instead of embedding delimiter symbols, thereby using up valuable bandwidth that could otherwise have been used for data bits, an alternative solution may be used, in which P is chosen as a multiple of M/K. Thus, the beginning of a packet is also the start of a MCLT block.

In one embodiment, the first MCLT block of a packet can be marked by using different spreading codes $c'_{one}(k)$ and $c'_{zero}$ for embedding data. If the receiver finds these codes during synchronization, then the receiver knows that the current block marks the beginning of a packet. In some embodiments, the synchronization algorithm disclosed herein may be adapted to not only synchronize to the correct block offset but also to find the beginning of a packet. Rather than calculating the signal strength for each block and the single spreading code $c_{one}(k)$, both signal strength measures for both spreading codes $c_{one}(k)$ and $c'_{one}$ are computed, and the maximum of the two resulting values is used. To this end, the two spreading codes should be complementary sequences; in other words, their cross-correlation should be low. Because the packet size P is constant, the receiver knows where packets start and end, once the receiver has performed synchronization using the adapted algorithm.

In one embodiment, a redundancy factor R for repetition coding may be selected. In cases where redundancy is added to each packet, R is chosen as a divisor of the packet size P. Instead of embedding a sequence of bits only once into the audio signal, the sequence of bits is embedded R times consecutively. When choosing R as a divisor of the number of bits encoded per MCLT block, the repetitions of a single bit are encoded in the same sub-bands of different blocks. Then, if the channel is noisy in a certain frequency range, it would not be feasible to decode the data, despite the added redundancy. This can be addressed by carefully selecting R so that it does not align with the block partitioning. An alternative solution involves reordering the spreading codes before encoding with a predefined mapping, and mapping the spreading codes back to their initial order after extracting the phase values at the receiver.

In one embodiment, CRC codes may also be used to detect transmission errors. CRC codes are a form of checksum based on the remainder of a division of a bit sequence by a so-called generator polynomial over the finite field GF(2). The CRC code is computed before repetition coding of a sequence of bits and appended to the end of the sequence. Thus, the CRC code is also repetition-coded to make sure it is transmitted correctly.

Figure 11:
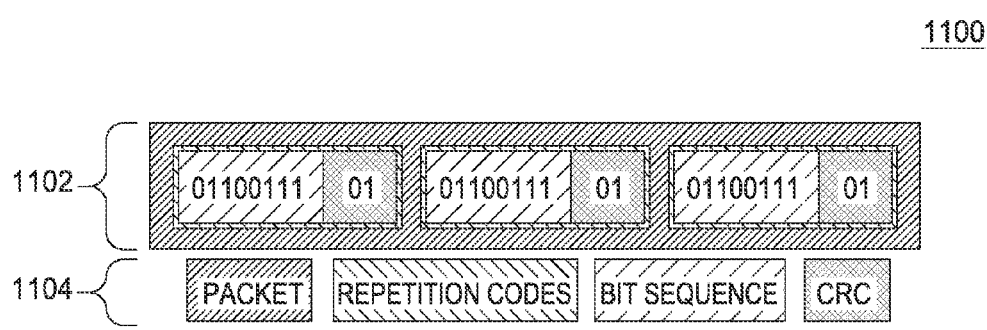
FIG. 11 is a diagram showing a structure of a packet containing a repetition-coded bit sequence with CRC code, according to one embodiment presented in this disclosure.

FIG. 11 is a diagram 1100 showing a structure 1102 of a packet containing a repetition-coded bit sequence with CRC code, along with an associated legend 1104, according to one embodiment presented in this disclosure. For a packet length of P, a redundancy factor of R, and a CRC length of C, a packet can contain a bit sequence with the maximum length of L=P/R−C. After transmission, decoding the phase content at the receiver results in a sequence of correlation coefficients ρ(n) for each packet (Equation 18). This sequence contains one value per initially embedded bit. Because the data is repetition-coded, the redundancy can be used to correct errors. As described above, the sign of a value in ρ(n) represents the value of the corresponding bit (0 or 1). The magnitude gives a measure of certainty that a bit was transmitted correctly. By adding up the redundant correlation coefficients, combine the R repetition codes are combined, weighting each of their bits according to this measure. Accordingly, bits that are likely correct have more influence on the result than bits that are likely incorrect. Formally, this can be expressed as follows:

$$\hat{\rho}(n) = \frac{1}{R}\sum_{m=0}^{R-1} \rho(mR+n), \quad \text{(Equation 28)}$$

where $n = 0, 1, \ldots, P/R, m \in \mathbb{Z}$.

The correlation coefficients in $\hat{\rho}(n)$ can then be translated to bits according to their sign. Then the CRC of the resulting bit sequence is computed to verify the validity of the data in the current packet.

Accordingly, reliability of the acoustic data transmission link may be improved using the techniques disclosed herein. In some embodiments, however, feedback from the receiver to the transmitter is required in order to achieve a reliable channel with a negligible probability of transmission errors. For instance, such feedback may be in the form of positive/negative acknowledgments (ACK/NACK) in an acoustic data transmission system between smartphones, for smartphones that are equipped with both speakers and microphones. However, at least some techniques are not necessarily suited for such a system, such as techniques in which phase coding is processed offline and therefore does not support dynamically encoding data into audio in real-time. However, in alternative embodiments, the acoustic data transmission system may be configured with real-time phase encoding based on the techniques disclosed herein.

In one embodiment, the acoustic data transmission system may be implemented in any predefined programming language such as matrix laboratory (MATLAB). The acoustic data transmission system contains both the data embedding and extraction algorithms and can therefore act as both the transmitter and as the receiver. A data embedding module accepts bit sequences from vectors consisting of zeros as input data. Arbitrary audio files in the common uncompressed .wav format may be used as carriers. The acoustic data transmission system implements all three phase coding methods disclosed above for both embedding and extraction of data. Interference cancellation, block selection, and repetition coding and CRC codes are also supported, and phase coding is performed in the MCLT domain. In addition, the acoustic data transmission system contains a script that embeds information, extracts the information, and compares the result to the initial input. This can be used to evaluate the three phase coding methods against each other for different parameter configurations.

In one embodiment, as an alternative to playing back the phase-coded audio signal and recording it with a microphone, the acoustic data transmission system supports simulating an acoustic channel. The characteristics of a channel may be described by its impulse response, which is measurable. When viewing at the audio channel as a linear time invariant filter, its effects may be simulated by convolving its impulse response with the signal to be transmitted over the channel. The acoustic data transmission system uses convolution defined in Equation 8 to simulate an acoustic channel given its impulse response.

Figure 12:
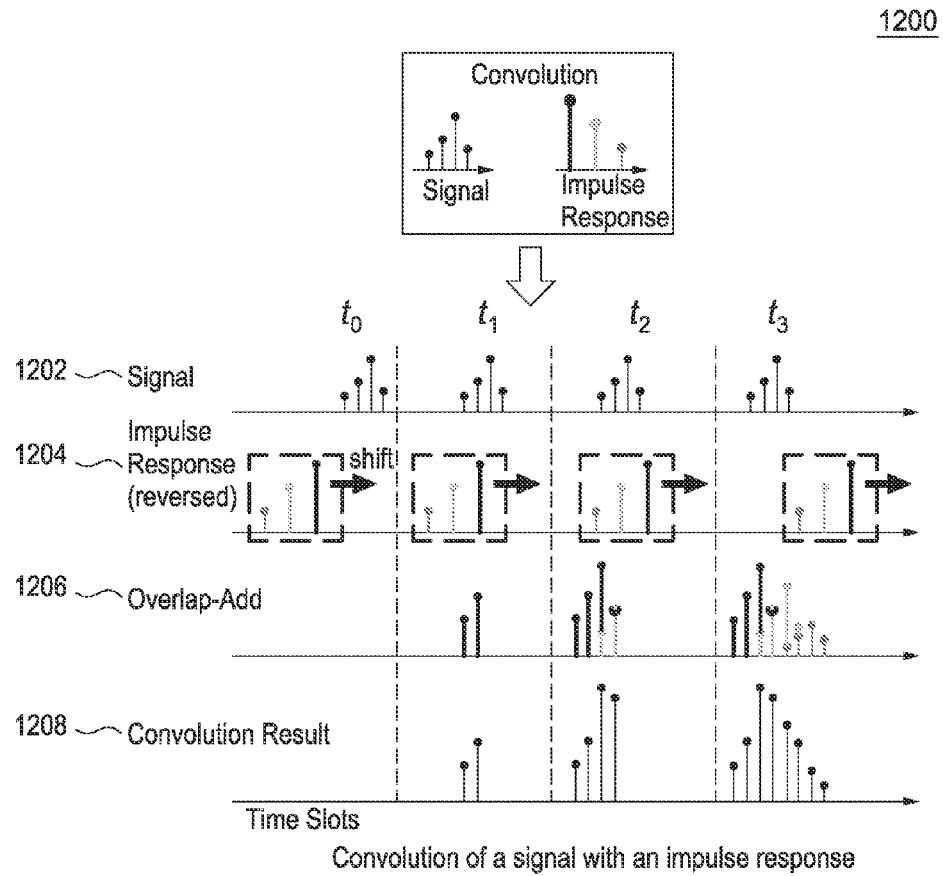
FIG. 12 is a diagram illustrating filtering by convoluting a signal with an impulse response, according to one embodiment presented in this disclosure.

FIG. 12 is a diagram 1200 illustrating filtering by convoluting a signal 1202 with an impulse response 1204, according to one embodiment presented in this disclosure. The reversed impulse response of the acoustic channel is shifted across the signal and multiplied with the signal at each discrete sample offset. The results of these individual multiplications are then overlap-added via an operation 1206 to produce a convolution result 1208 that is the filtered signal. In some embodiments, the acoustic data transmission system also supports simulating time shifts introduced by digital-to-analog/analog-to-digital conversion, which can be smaller than a single sample.

In one embodiment, acoustic data transmission techniques may be combined with space diversity techniques to further increase the reliability of the data link. In space diversity, multiple receivers and/or transmitters are used to improve the quality and reliability of wireless communication links. This concept may also be referred to as antenna diversity in radio communications. The usage of multiple antennas at both the transmitter and the receiver is termed Multiple-Input Multiple-Output (MIMO), which is an important part of modern wireless communication standards, e.g., any form of wireless fidelity (Wi-Fi) such as Institute of Electrical and Electronics Engineers (IEEE) 802.11n. In some embodiments, the acoustic data transmission system may be configured to include multiple antennas or receivers but only a single transmitter. This configuration may be referred to as Single-Input Multiple-Output (SIMO). The operating mode or operating configuration of the acoustic data transmission system may be MIMO or SIMO, depending on the needs of a particular case. In some embodiments, any operating mode supporting multiple transmitters may be used in conjunction with the embodiments disclosed herein.

In one embodiment, because of reflections that may often occur in indoor environments, an emitted signal may take multiple different paths to the receiver. Reflections lead to phase shifts and other distortions that can cause destructive interference at the receiver (fading). Interference makes the signal more difficult or impossible to decode. Because the type and degree of interference is location- and time-dependent, multiple physically separated receivers allow the same signal to be observed under different conditions. Often, if one receiver experiences a large amount of destructive interference, one of the other receivers has sufficient signal quality. By combining the received signals from all the receivers according to techniques disclosed herein, link quality and reliability can be drastically improved at least in some cases.

At least in some embodiments, the link quality of the acoustic data transmission system may at times suffer from interferences caused by reflections of the sound waves from walls and objects. Another scenario is that some of the receivers may not be well-positioned or may be exposed to noise. Smartphones may be located inside of a pocket or purse or even next to a rustling popcorn bag in the cinema. In one embodiment, spatial diversity may be applied to alleviate these scenarios. Assuming that L receivers are connected to each other in a network with reliable communication links, a predefined diversity scheme allows each receiver to decode the data independently, and the resulting bit sequences may be combined via majority voting. This means that for each bit, the number of receivers that decoded a 1 as well as the amount of receivers which vote for a −1 are counted. The higher number of votes then determines the value of a bit in the combined sequence. Formally this can be expressed as:

$$\hat{b}(n) = \begin{cases} 1, & \sum_{l=0}^{L-1} b_l(n) \geq 0 \\ -1, & \sum_{l=0}^{L-1} b_l(n) < 0, \end{cases} \quad \text{(Equation 29)}$$

where l=0, 1, . . . , L−1 are the indices of the receivers, $b_l(n) \in \{-1, 1\}$ with n=1, 2, . . . , N is the bit sequence of length N decoded at receiver l, and $\hat{b}(n)$ is the combined sequence.

Note that in Equation 29, −1 is used to represent the 0-bit to simplify notation. The number of receivers L should be odd. Otherwise, especially with a low number of receivers, a vote may often end up as a draw. In that case, no majority decision can be made, and by convention of the above formula, the corresponding bit is assumed to be a 1. Another issue with this type of diversity is that receivers experiencing poor signal quality may have the same impact on the final bit sequence as receivers that experience good signal quality.

In one embodiment, the predefined space diversity scheme may be improved to keep track of how many times each receiver voted correctly (the same as the majority vote). The improved space diversity scheme may be referred to as an adaptive space diversity scheme. The number of correct votes may be translated into a weight $w_l \in [0, 1]$, which determines how much impact the votes from a receiver is to have in the future. These weights change with time, and the more correct votes a receiver makes, the higher its weight becomes, and vice versa. The number of previous votes taken into account to update the weights influences how fast the diversity scheme adapts to changes in signal quality (sliding window). This leads to the following new formula:

$$\hat{b}(n) = \begin{cases} 1, & \sum_{l=0}^{L-1} w_l b_l(n) \geq 0 \\ -1, & \sum_{l=0}^{L-1} w_l b_l(n) < 0. \end{cases} \quad \text{(Equation 30)}$$

A further improvement of this diversity scheme computes several different weights for each receiver, for example one for each sub-band. This helps cope with situations in which interference leading to decoding errors might only occur in the lower frequency range at one receiver, whereas another receiver cannot decode bits due to distortions in the high frequency spectrum.

As described above in conjunction with Equation 18, phase decoding results in a sequence of correlation coefficients in some embodiments. These correlation coefficients give a measure for the correctness of the corresponding bits, which can be used for diversity purposes. Such a space diversity scheme may be referred to as a space diversity scheme with spreading code correlation sequences. Instead of combining the bit sequences $b_l(n)$ from each receiver, their correlation sequences $\rho_l(n)$ are combined:

$$\hat{\rho}(n) = \frac{1}{L} \sum_{l=0}^{L-1} \rho_l(n), \quad \text{(Equation 31)}$$

where
L=The total number of receivers
$b_l(n) \in \{-1, 1\}$=The bit sequence of length N decoded at receiver l $$\rho_l(n) = \frac{1}{K} \sum_{k=0}^{K-1} b_l(nK+k) c_{one}(k) \quad \text{(from Equation 18)}$$

$\hat{\rho}(n)$=The combined spreading code correlation sequence.

Note that Equation 31 is essentially the same as the formula for combining repetition codes (Equation 28). Equation 31 computes a weighted sum of the signals received at the different, physically separated receivers. Bits with high corresponding correlation coefficients are likely to be decoded correctly and therefore have a stronger influence on the combined sequence than the bits with a low corresponding correlation coefficient. As discussed above, the sign of $\hat{\rho}(n)$ determines if the corresponding bit is a −1 (logical 0) or a 1 (logical 1).

Figure 13:
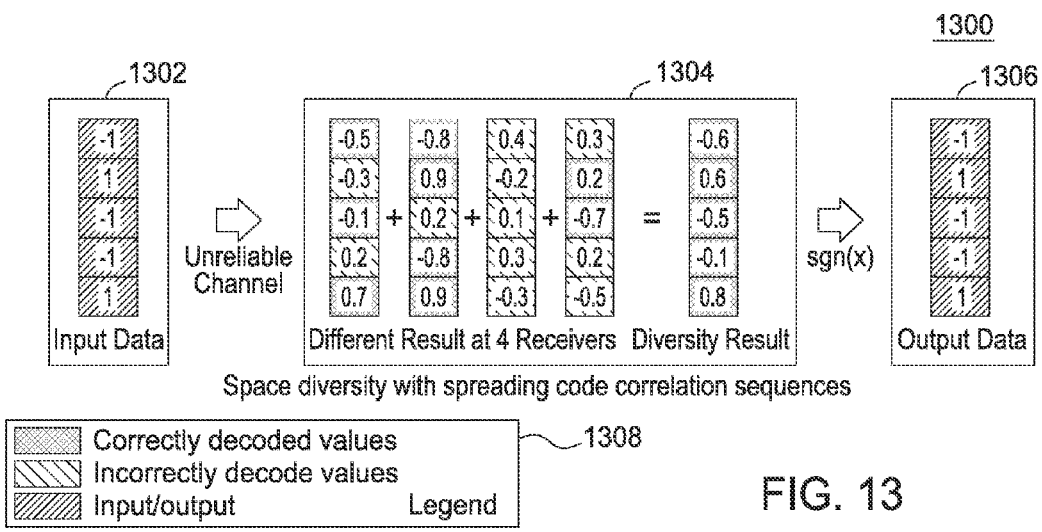
FIG. 13 is a diagram illustrating the space diversity scheme with spreading code correlation sequences, according to one embodiment presented in this disclosure.

FIG. 13 is a diagram 1300 illustrating the space diversity scheme with spreading code correlation sequences, according to one embodiment presented in this disclosure. As shown, the spreading code sequence s={−1, 1, −1, −1, 1} is transmitted over an unreliable channel. Four receivers decode the input signal containing input data 1302, leading to different spreading code correlation sequences 1304. Correctly decoded values, incorrectly decoded values, and input/output values are designated as shown in legend 1308. Although none of the receivers decodes the whole sequence on its own, the combined output of the diversity scheme, containing output data 1306, is correct. Applying the signum function sgn (x) to the sum of the spreading code correlation sequences $\hat{\rho}(n)$ results in the originally transmitted sequence s. Note also that the diversity scheme based on majority votes defined in Equation 29 would fail in this particular example and would only decode the second and the last spreading code symbol correctly. For these symbols the majority vote would result in a draw, which by convention of this scheme produces a 1 in the output sequence.

In one embodiment, if packets with CRC codes are used, the space diversity scheme may be further optimized. Before combining the packets, their CRC is computed. If a cyclic redundancy check was successful, the corresponding packet can be assumed to be valid. The packet is thus used as the result instead of computing the combined result of all packets as discussed above. Accordingly, at least some embodiments herein are described with reference to an acoustic data transmission system that implements space diversity with spreading code correlation sequences and CRC optimization.

Figure 14:
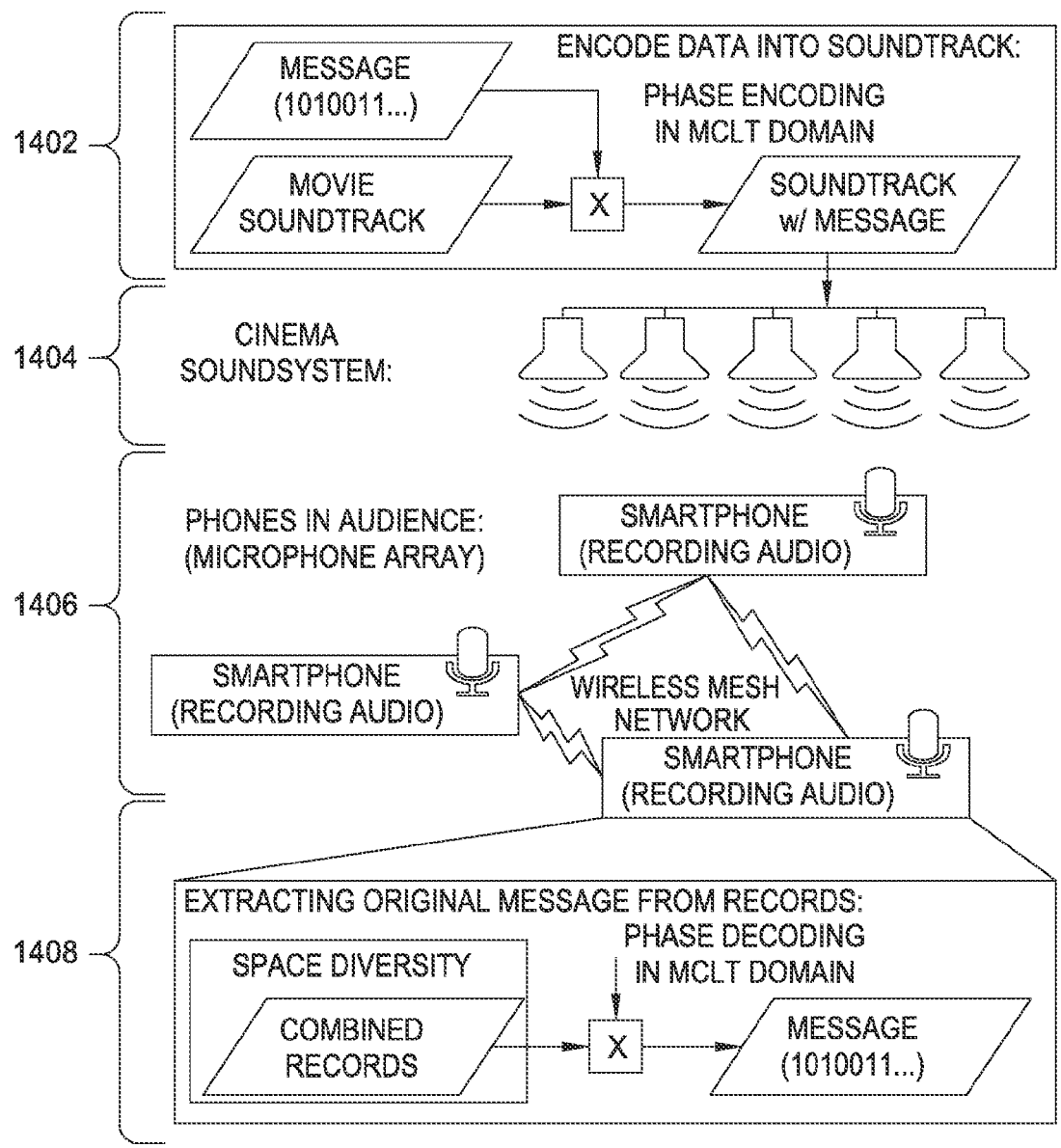
FIG. 14 illustrates an architecture for an acoustic data transmission system suited at least for movie theaters, according to one embodiment presented in this disclosure.

FIG. 14 illustrates an architecture 1400 for an acoustic data transmission system suited at least for movie theaters, according to one embodiment presented in this disclosure. As shown, the architecture 1400 includes a cinema sound system 1404 that acoustically transmits encoded data 1402 and smartphones 1406 that perform data extraction 1408. The acoustic data transmission system is implemented based on phase coding in the MCLT domain described above. A soundtrack containing embedded data is played back over the sound system of the cinema and recorded by the microphones of smartphones of moviegoers in the audience. These smartphones execute a receiver application configured to decode the hidden message in the soundtrack. To improve reliability of the acoustic communication link, the receivers are connected in a mesh network and apply the diversity technique described above in conjunction with Equation 31.

In one embodiment, the receiver application has a graphical user interface (GUI) that includes a button to start/stop reception and an area where the received data is displayed. In a particular embodiment, the receiver application is configured to decode two different data formats transmitted through an acoustic channel: simple sequences of bits and packets with American Standard Code for Information Interchange (ASCII) characters. The encoder is configured to use repetition codes with a redundancy factor of three and CRC codes for the ASCII packets. When setting the rest of the encoding parameters to their default values, a data rate of about 160 bits per second is achieved. Accordingly, in the case of 8-bit ASCII encoding, 20 characters per second can be transferred. When transmitting arbitrary bit sequences without redundancy coding and CRC codes, the default encoding parameters permit a data rate of 520 bits per second, in which case the data rate is equal to the bit rate of the system, because no redundant bits are transmitted.

In one embodiment, communication between different receivers for diversity purposes is achieved through a Wi-Fi ad-hoc network hosted by one of the receivers. Creating the network programmatically may not necessarily be officially supported by the operating systems of the smartphones. However, automatic peer-to-peer networks may still be possible using Bluetooth on the operating system. In some embodiments, the receiver application is extended to support Bluetooth in addition to Wi-Fi. And although communication over a Wi-Fi hotspot or cellular network is also contemplated, in such scenarios the information does not need to be embedded in the audio signal but can directly be transmitted via a Wi-Fi or cellular connection. The amount of information exchanged between receivers over the ad-hoc network is fairly low. For each bit received over the acoustic channel, a 32-bit floating point number is sent to the diversity server which, in turn, sends back a single bit containing the diversity result. Thus, for an acoustic data transmission bit rate of 520 bits per second, the resulting Wi-Fi traffic amounts to 33*520=17,160 bits per second, which is approximately 20 kilobits per second.

In one embodiment, the integrated phase decoding algorithm uses a Fast Modulated Complex Lapped Transform (FMCLT) implementation. That vector instructions are used to compute the transform and phase manipulations has a positive impact on performance of the receiver application, thus conserving battery of the smartphone on which the receiver application is executing. In a particular experiment in which the receiver application executing on a smartphone constantly received data from a server over Wi-Fi but did not communicate its results back to the server, the battery level of the smartphone dropped down to fifty percent after five-and-a-half hours, and battery consumption may be higher with diversity over Wi-Fi.

Figure 15:
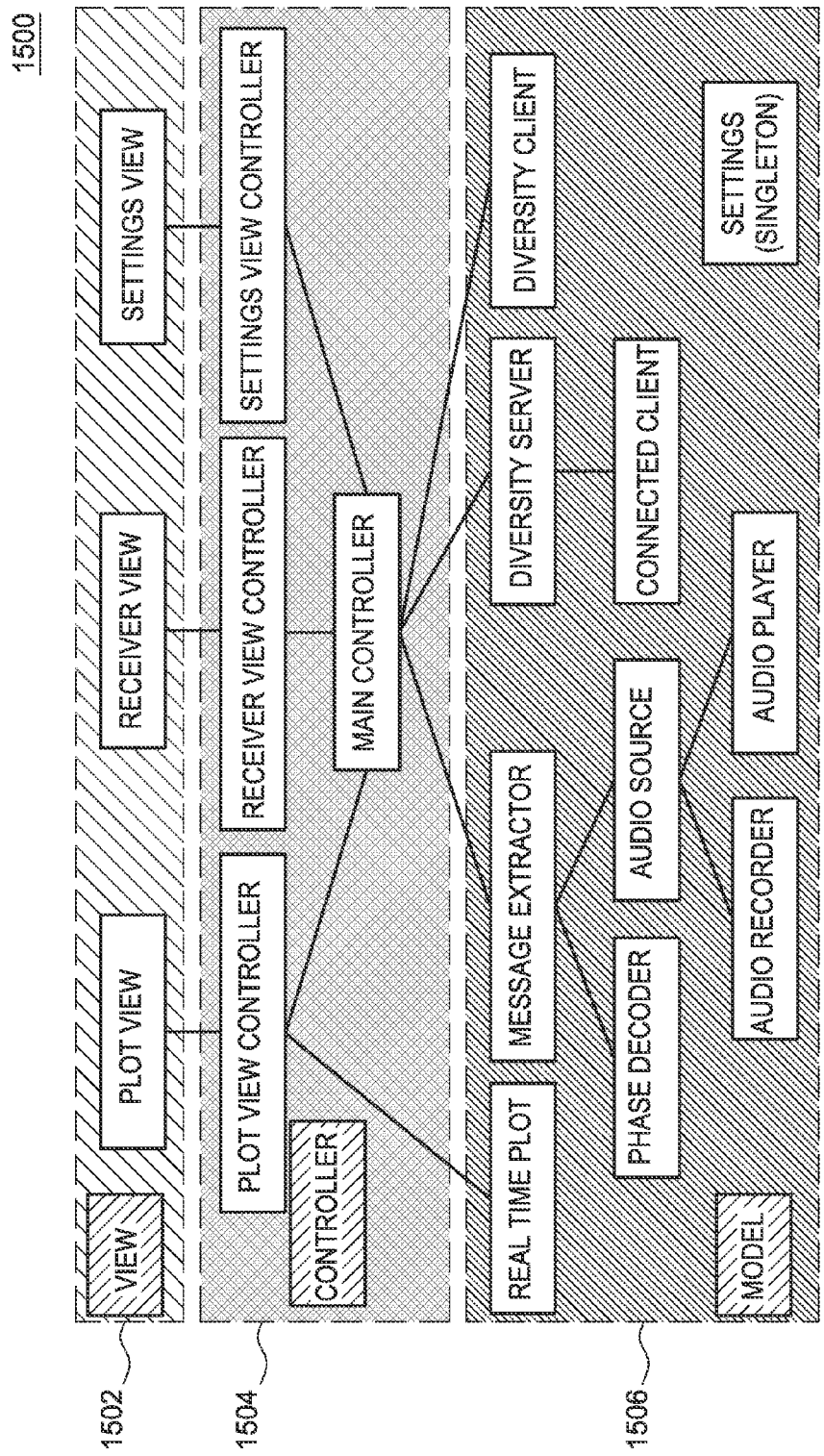
FIG. 15 illustrates an architecture for a receiver application of the acoustic data transmission system, according to one embodiment presented in this disclosure.

FIG. 15 illustrates an architecture 1500 for the receiver application, according to one embodiment presented in this disclosure. As shown, the architecture 1500 is based on a model view controller (MVC) design pattern, which includes model components 1506, view components 1502, and controller components 1504. Structuring the receiver application into separate components (modules) with well-defined interfaces (protocols) may improve the extensibility of the receiver application at least in some cases. Modules depend only on the interfaces of each other and not on the internal implementations of each other. A component can thus easily be adapted, extended or even replaced without having to change the source code of its connected modules. New components may also be more readily introduced. For instance, to provide communication over Bluetooth instead of Wi-Fi, BluetoothClient and BluetoothServer classes that implement the client and server interfaces, respectively, may be provided. The MainController class connected to both the server and client modules does not necessarily need to be adapted, because the interface for communication with the two new classes is the same as for the existing Wi-Fi client and server.

Figure 16:
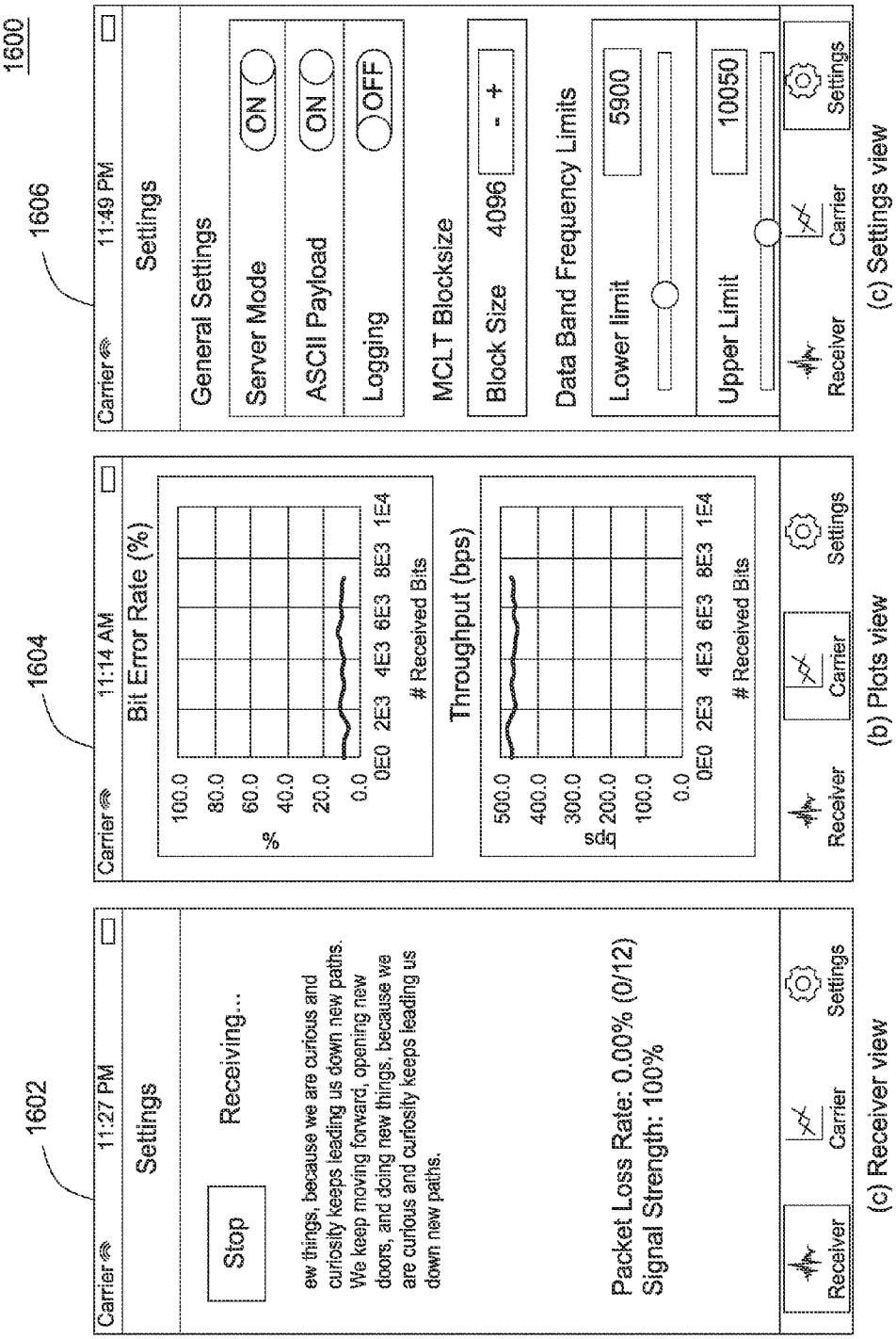
FIG. 16 is a diagram illustrating GUI outputs associated with view components of the receiver application, according to one embodiment presented in this disclosure.

FIG. 16 is a diagram 1600 illustrating GUI outputs 1602, 1604, 1606 associated with the view components 1502 of the receiver application, according to one embodiment presented in this disclosure. The view components 1502 include ReceiverView, PlotView and SettingsView shown in FIG. 15. The views components 1502 are accessible from a navigation bar on the bottom of the screen of the receiver application. Switching between the view components 1502 via predefined swipe gestures may also be supported.

In one embodiment, the ReceiverView allows a user to start and stop the receiver by tapping a button at the top of the screen. The current state of the receiver application is displayed as a text label next to the button. When the user launches the receiver application, the receiver application begins in the Connecting state. Once the connection to the server is established, the current state changes to the Syncing state. As soon as the receiver application is synchronized to an input audio signal with embedded data, the current state switches to the Receiving state. In the Receiving state, the received data (bits or ASCII text) is displayed to the user along with the current packet loss rate and signal strength. In the case of ASCII text, successfully received character sequences are denoted with a font background of green, while invalid characters are denoted with a font background of red. When the user indicates to stops reception, the current state of the receiver application switches to the Stopped state.

FIG. 17 is a table 1700 illustrating configurable parameters of the receiver application, according to one embodiment presented in this disclosure. In one embodiment, SettingsView provides access to at least these configurable parameters. In some embodiments, when the SettingsView is invoked, the receiver application halts receiving operations, in order to prevent parameter changes from leading to undefined behavior. In one embodiment, the PlotView includes two plots: a bit error rate plot and a throughput plot. Provided that the application continues to receive data, both graphs are updated in real-time.

In one embodiment, the model components 1506 contain the application logic. The model components 1506 may be divided into four parts: the Settings singleton, the data extraction logic, the diversity client and the diversity server. In some embodiments, the model components 1506 also include classes with logging features used for performance evaluation. The Settings class is a singleton that contains the configurable parameters of the receiver application and shown in FIG. 17. Given that many of these settings are used across all the modules of the system, the settings may preferably be stored in a central place that is accessible from anywhere in the receiver application. The initial configuration is loaded from a settings property list file when the receiver application is launched. The settings can then be changed by the user in the SettingsView. The current configuration is saved in the property list file before the receiver application terminates.

In one embodiment, in terms of the data extraction logic, as soon as the user activates the start button in the ReceiverView, the MessageExtractor constantly receives new audio blocks from an AudioSource, which is normally an AudioRecorder. The AudioPlayer component is only used for testing and supports reading blocks directly from an audio file stored on the device instead of recording a signal through the microphone. Once the MessageExtractor receives a new audio block, the MessageExtractor passes the new audio block on to the PhaseDecoder. The PhaseDecoder synchronizes to the signal hidden in the recorded audio and extracts the embedded data using block relative phase decoding described above. The PhaseDecoder then sends the result back to the MessageExtractor, which in turn forwards the result to the MainController.

In one embodiment, the MainController then forwards the extracted data to the DiversityClient, which in turn sends the extracted data to the DiversityServer. At least in some embodiments, the MessageExtractor does not directly communicate with the DiversityClient in order to keep data extraction logic separate from client networking code. Results received from the server are passed back to the MainController.

In one embodiment, the DiversityServer class is only used on the particular device that acts as a server in the ad-hoc network of receivers. Thus, at least in some embodiments, the DiversityServer is kept separate from the rest of the model and only made visible to the MainController. Each receiver in the network sends extracted packets through its DiversityClient to the DiversityServer. The server reads the decoded sequence of each ConnectedClient and combines them using the diversity scheme from Equation 31 with the CRC optimization discussed above. The ConnectedClient class is the server-side counterpart of the DiversityClient class. At least in some embodiments, the clients are synchronized to each other to avoid incorrect results stemming from combining decoded packets representing different blocks of the recorded audio. The DiversityServer operates in predefined rounds to keep the clients synchronized. A round starts as soon as a ConnectedClient delivers a new packet and ends after a timer with a predefined duration has expired. The timer is started at the beginning of the round. As long as the timer is running, the other ConnectedClients have time to deliver new packets also. This timer is preferable at least in some cases, because the receivers receive the embedded data with a certain delay depending on their distance from the speaker system and the speed of sound. In addition, the Wi-Fi link may also introduce a short delay.

In one embodiment, after the timer has expired, the delivered packets are combined, and the result is sent over the network to all of the ConnectedClients. Clients that could not deliver a packet in time are considered out of sync. Unsynchronized clients keep receiving results from the server, but their packets are not included in the diversity computations. The DiversityServer keeps track of how many packets the clients are behind by and disconnects them if they are not able to catch up within a certain number of rounds. ConnectedClients may often get out of sync due to a temporarily unreliable Wi-Fi connection. Once the Wi-Fi connection operates reliably again, the ConnectedClients may catch up without issue, because Wi-Fi may provide much higher data rates than the acoustic data transmission system. At least in some embodiments, the key factor for synchronization of the clients is not the bandwidth but rather the delay of the network connection. To tolerate a higher network delay, the sync block interval parameter may be increased, which leads to a larger packet size. The bigger the packets, the longer it takes to extract them from the audio signal, and therefore the more time the DiversityServer has to combine them before the next set of packets is to be handled. At least in some embodiments, no dedicated server device is needed. The smartphone that runs the DiversityServer can simultaneously act as a receiver with a DiversityClient.

In one embodiment, the controller components 1504 include four controller classes, including one for each of its views and a main controller. The main controller, referred to as MainController, inherits from the TabBarController class, which is part of an application programming interface (API) associated with the operating system of the smartphone. When the receiver application is launched, the receiver application instantiates the three view controllers and hosts them in a tab bar. This causes a navigation bar to be displayed in each view at the bottom of the screen. When the user switches between views, the MainController receives an event and can display the requested view. The MainController also instantiates the MessageExtractor, the DiversityClient and the DiversityServer and manages interactions between these modules. The view controllers receive events from their corresponding views and handle them in order to keep the views up to date. Events that cause a change of the application state are passed on to the MainController, which is configured to update the model accordingly. One exception, however, is the SettingsViewController. Whenever the SettingsView is loaded, the SettingsViewController instructs the MainController to stop recording and message extraction. Then the SettingsViewController updates the settings according to user input in the Settings singleton.

FIG. 18 is a flowchart depicting a method 1800 for acoustic data transmission, according to one embodiment presented in this disclosure. As shown, the method 1800 begins at step 1802, wherein the audio transmitter application 102 receives audio content and data to embed into the audio content. At step 1804, the audio transmitter application 102 generates modified audio content by encoding the received audio content based on a predefined set of acoustic data encoding rules. In the use case scenario of the data being text, the acoustic data encoding rules are acoustic text encoding rules. At least in some embodiments, the received audio content is encoded such that the data is imperceptible to the human ear during playback of the modified audio content or such that any differences between playback of the audio content and playback of the modified audio content are imperceptible to the human ear. As stated above, in this regard, imperceptibility to the human ear may be measured based on a predefined, objective standard, such as the modified audio content satisfying predefined signal characteristics defined based on typical human hearing attributes. For example, in one embodiment, the modified audio content satisfies a predefined signal constraint characterizing imperceptibility of any differences between playback of the audio content and playback of the modified audio content or imperceptibility of the specified data during playback of the modified audio content.

At step 1806, the audio transmitter application 102 acoustically transmits the text to a receiving entity such as the audio receiver application 104, by playing the modified audio content. At least in some embodiments, the audio receiver application 104 is configured to, at step 1808, acoustically detect playback of the modified audio content. The audio receiver application 104 is also configured to, at step 1810, decode the data based on the acoustically detected playback of the modified audio content. At least in some embodiments, multiple instances of the audio receiver application 104 collaboratively decode the data using a network and according to a predefined diversity scheme. In a particular embodiment, the network is an ad-hoc Wi-Fi or Bluetooth network, and the predefined diversity scheme is adaptive space diversity optionally with spreading code correlation sequences, CRC optimization, or both. Further, at least in some embodiments, the decoded data is identical to the data received by the audio transmitter application 102 at step 1802. The audio receiver application 104 is also configured to, at step 1812, perform a predefined action on the decoded data. Examples of predefined actions include outputting the decoded data and generating an output based on the decoded data, where the generated output does not include the decoded data.

Figure 19:
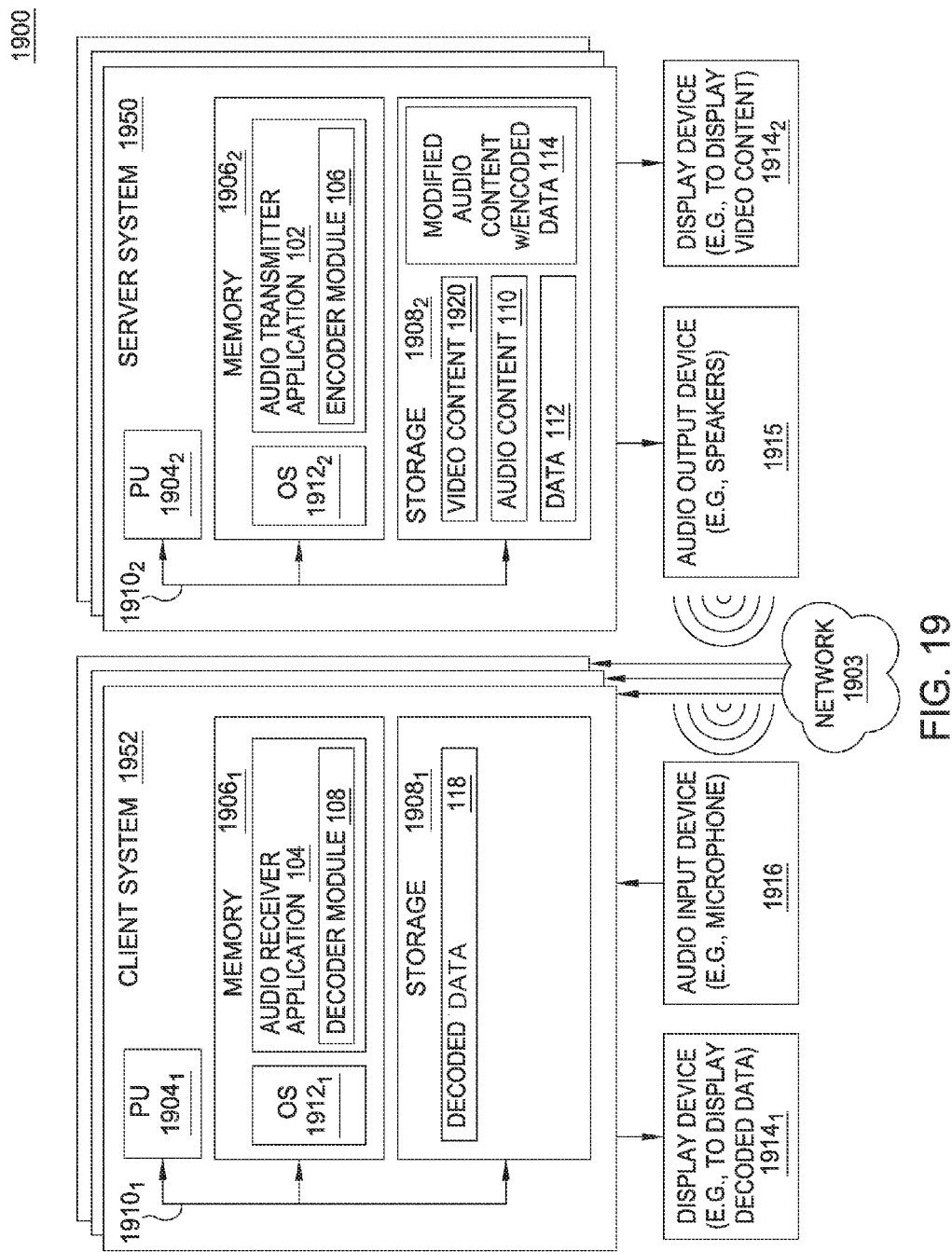
FIG. 19 is a block diagram illustrating a system for acoustic data transmission, according to one embodiment presented in this disclosure.

FIG. 19 is a block diagram illustrating a system 1900 for acoustic data transmission, according to one embodiment presented in this disclosure. The system 1900 corresponds to the system 100 of FIG. 1. As shown, the system 1900 includes a plurality of client systems 1952 and a plurality of server systems 1950. The client systems 1952 are communicatively coupled via a network 1903. In some embodiments, the server systems 1950 may also be communicatively coupled via the network 1903 or via a network other than the network 1903. In one embodiment, the network 1903 is an ad hoc network connecting multiple cellular phones.

In one embodiment, the client systems 1952 may include existing computer systems, e.g., smartphones and other cellular phones, desktop computers, server computers, laptop computers, tablet computers, gaming consoles, hand-held or portable devices and the like. The client systems 1952 illustrated in FIG. 19, however, are merely examples of computer systems in which embodiments disclosed herein may be used. Embodiments disclosed herein may be implemented differently, regardless of whether the computer systems are complex multi-user computing systems, such as a cluster of individual computers connected by a high-speed network, single-user workstations, or network appliances lacking non-volatile storage. Moreover, it is explicitly contemplated that embodiments disclosed herein may be implemented using any device or computer system capable of performing the functions described herein.

As shown, each client system 1952 and server system 1950 includes, without limitation, a processor 1904, which obtains instructions and data via a bus 1910 from a memory 1906 and storage 1908. The processor 1904 is a programmable logic device that performs instruction, logic, and mathematical processing, and may be representative of one or more CPUs. The memory 1906 is any memory sufficiently large to hold the necessary programs and data structures. The memory 1906 could be one or a combination of memory devices, including Random Access Memory, nonvolatile or backup memory (e.g., programmable or Flash memories, read-only memories, etc.).

As shown, the memory 1906 includes an operating system ("OS") 1912. Operating system 1912 is software used for managing the operation of the client system 1952 or the server system 1950. Examples of the OS 1912 include UNIX, versions of the Microsoft Windows® operating system and distributions of the Linux® operating system. Additional examples of the OS 1912 include custom operating systems for smartphones and gaming consoles, including the custom operating systems for systems such as the Microsoft Xbox 360®, Nintendo WHO and Sony PlayStation® 3. As shown, the memory $1906_1$ of the client system 1952 further includes the audio receiver application 104 having the decoder module 108, according to embodiments described above. The memory $1906_2$ of the server system 1950 further includes the audio transmitter application 102 having the encoder module 108, according to embodiments described above.

In one embodiment, the storage 1908 is representative of hard-disk drives, flash memory devices, optical media and the like. Generally, the storage 1908 stores application programs and data for use by the client systems 1952. In addition, the memory 1906 and the storage 1908 may be considered to include memory physically located elsewhere; for example, on another computer coupled to the client system 1952 or to the server system 1950 via the bus 1910. The client systems 1952 and the server systems 1950 include network interfaces for operably connecting to one another via a network, such as the network 1903. As shown, the storage $1908_2$ of the server system 1950 includes the audio content 110, video content 1920 that is associated with the audio content 110, the data 112, and modified audio content 114 having encoded text, according to embodiments described above. The storage $1908_1$ of the client system 1952 includes the decoded text 108, according to embodiments described above.

In one embodiment, the server systems 1950 and the client systems 1952 are each coupled to a display device 1914. The display devices 1914 may include output devices such as cellular phone displays, movie theater displays, monitors, touch screen displays, and so on. For example, in a particular embodiment, the display devices $1914_1$ of the client systems 1952 may include smartphone displays used to visually convey the decoded data 118, while the display devices $1914_2$ of the server system 1950 may include a cinema display used to play back the video content 1920. At least in some embodiments, the video content 1920 is not played back via the display devices $1914_1$ of the client systems 452, and the data 112 is not conveyed via the display devices $1914_2$ of the server system 1950. In one embodiment, where the text includes song lyrics of the audio content being played back, the audio receiver application 104 is configured to convey each syllable or word of the song lyrics, concurrently with the respective syllable or word is being played back in the audio content, thereby synchronizing visual display of the song lyrics of the audio content with aural playback of the audio content.

In some embodiments, each display 1914 may provide a touch sensitive surface allowing the user to interact with the decoded data 118, such as to select a coupon or other incentive, a physical good or a virtual good pertaining to the audio content 110 or the video content 1920. The audio input device 1915 may represent any device configured to produce sound, such as a loudspeaker. The audio input device 1916 may represent any device configured to detect sound, such as a microphone. In a particular embodiment, in acoustically playing back the modified audio content 114, the loudspeaker of a movie theater produces sound that is detected by the microphone of a cellular phone, and the cellular phone decodes text from the detected sound and outputs the decoded text via a display screen of the cellular phone, thus providing cellular phone users with a more immersive multimedia experience in the movie theater at least in some cases.

In some embodiments, each client system 1952 or server system 1950 may include other input devices such as keypads, keyboards, mice, controllers, and so on. Such input devices may include a set of buttons, switches or other physical device mechanisms for controlling the client system 1952 or the server system 1950. For example, such input devices could include a set of directional buttons used to select a coupon or other incentive, a physical good or a virtual good presented on the display device 1914. Additionally or alternatively, such input devices may also include one or more sensors such as cameras, GPS modules, accelerometers, light sensors, etc.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects presented in this disclosure may be embodied as a system, method or computer program product. Accordingly, aspects disclosed herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects disclosed herein may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects disclosed herein may be written in any combination of one or more programming languages, including an object oriented programming language such as Java, Smalltalk, C++ or the like and conventional procedural programming languages, such as the "C" programming language or similar programming languages. The program code may execute entirely on the computer of a user, partly on the computer of the user, as a stand-alone software package, partly on the computer of the user and partly on a remote computer, or entirely on the remote computer or server. In the latter scenario, the remote computer may be connected to the computer of the user via any type of network, including a local area network (LAN) or a wide area network (WAN), or the connection may be made to an external computer (for example, through the Internet using an Internet Service Provider).

Aspects presented in this disclosure are described above with reference to flowchart illustrations or block diagrams of methods, apparatus (systems) and computer program products according to embodiments disclosed herein. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart or block diagram block or blocks.

Embodiments disclosed herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, the audio content 110 or the data 112 may be stored in the cloud, while the audio transmitter application 102 or the audio receiver application 104 may additionally execute in the cloud, thereby improving availability of the audio content, the text, or the modified audio content at least in some cases.

The flowchart and block diagrams in the Figures illustrate the architecture, functionality, and operation of possible implementations of systems, methods and computer program products according to various embodiments disclosed herein. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams or flowchart illustration, and combinations of blocks in the block diagrams or flowchart illustration, can be implemented by special-purpose hardware-based systems that perform the specified functions or acts, or combinations of special purpose hardware and computer instructions.

While the foregoing is directed to embodiments presented in this disclosure, other and further embodiments may be devised without departing from the basic scope of contemplated embodiments. That is, although specific embodiments and numerous specific details are set forth to provide a more thorough understanding of the present disclosure, persons skilled in the art, however, will understand that various modifications and changes may be made thereto without departing from the broader spirit and scope of the disclosure. The foregoing description and drawings are, accordingly, to be regarded in an illustrative rather than a restrictive sense.

What is claimed is:

1. A method to collaboratively interpret acoustically detected playback of imperceptible audio content, the method comprising:
during playback of audio content having perceptible audio content and augmented to include imperceptible audio content, acoustically detecting playback of both the perceptible audio content and the imperceptible audio content of the augmented audio content, by each of a first receiving entity and a second receiving entity operatively connected to the first receiving entity via a network;
collaboratively decoding, by operation of one or more networked computer processors, the acoustically detected playback of the imperceptible audio content by the first and second receiving entities over the network and according to a predefined diversity scheme; and
generating an output by at least one of the first and second receiving entities, based on the acoustically detected, collaboratively decoded playback of the imperceptible audio content.

2. The method of claim 1, wherein the second receiving entity is spatially diverse from the first receiving entity, wherein the network comprises an ad-hoc network, wherein the ad-hoc network is selected from an ad-hoc Bluetooth network and an ad-hoc wireless fidelity (Wi-Fi) network.

3. The method of claim 1, wherein the predefined diversity scheme comprises adaptive space diversity with spreading code correlation sequences and cyclic redundancy check (CRC) optimization.

4. The method of claim 3, further comprising:
independently decoding intermediate data from the acoustically detected playback of the imperceptible audio content, by the first and second receiving entities; and
combining the intermediate data via majority voting to determine a final value for each bit of the imperceptible audio content.

5. The method of claim 4, wherein tie votes are determined in favor of a predefined bit value, wherein the majority voting is weighted based on a respective receiver weight associated with each of the first and second receiving entities;
wherein the second receiving entity is spatially diverse from the first receiving entity, wherein the network comprises an ad-hoc network, wherein the ad-hoc network is selected from an ad-hoc Bluetooth network and an ad-hoc wireless fidelity (Wi-Fi) network.

6. A method for acoustic data reception, the method comprising:
acoustically detecting playback of modified audio content by a first receiving entity, wherein the modified audio content comprises perceptible audio content and data encoded as imperceptible audio content,
acoustically detecting playback of the modified audio content by a second receiving entity spatially diverse from the first receiving entity and operatively connected to the first receiving entity via a network selected from an ad-hoc Bluetooth network and an ad-hoc wireless fidelity (Wi-Fi) network;
decoding the data based on the acoustically detected playback of the modified audio content, wherein the data is collaboratively decoded by the first receiving entity and the second receiving entity using the network and according to a diversity scheme comprising adaptive space diversity with spreading code correlation sequences and cyclic redundancy check (CRC) optimization, wherein decoding the data includes independently decoding intermediate data from the modified audio content by each receiving entity and combining the intermediate data via majority voting to determine a final value for each bit of the data, wherein the majority voting is weighted based on a respective receiver weight associated with each receiving entity, wherein tie votes are determined in favor of a predefined bit value; and
performing an action by the first receiving entity based on the collaboratively decoded data.

7. The method of claim 6, wherein each receiving entity casting a vote matching the majority vote for a given bit causes the receiver weight of the respective receiving entity to increase.

8. The method of claim 7, wherein each receiving entity casting a vote not matching the majority vote for the given bit causes the receiver weight of the respective receiving entity to decrease.

9. The method of claim 8, wherein each receiver has a plurality of receiver weights including the respective receiver weight, wherein each of the plurality of receiver weights is qualified by frequency sub-band in order to provide, for each frequency sub-band, greater influence to receiving entities that decode accurately for the respective frequency sub-band.

10. The method of claim 9, wherein decoding the data based on the acoustically detected playback of the modified audio content comprises:
performing phase decoding of the specified data in the frequency domain at each receiving entity to generate the intermediate data and a sequence of correlation coefficients that provide a measure of accuracy of the intermediate data; and
combining the sequence of correlation coefficients from each receiving entity to determine a set of correlation weights by which the intermediate data is further weighted when combined via the majority voting.

11. The method of claim 10, wherein decoding the data further based on the acoustically detected playback of the modified audio content comprises:
performing a CRC check prior to combining the intermediate data from each receiving entity, wherein the CRC check is performed at a receiving entity, wherein a successful CRC check causes acceptance of the intermediate data at the receiving entity in lieu of combining the intermediate data from each receiving entity.

12. The method of claim 11, wherein the imperceptible audio content satisfies a predefined signal constraint based on human hearing attributes, wherein the predefined signal constraint characterizes imperceptibility of the specified data during playback of the modified audio content, wherein performing a predefined action based on the collaboratively decoded data comprises, in respective instances: (i) outputting the collaboratively decoded data and (ii) generating an output based on the collaboratively decoded data, wherein the output does not include the collaboratively decoded data; wherein the data comprises, in respective instances, text for display, a network address, and Global Positioning System (GPS) coordinates.

13. The method of claim 12, wherein each receiving entity in the second instance comprises a respective one of a plurality of instances of a receiving application, each instance thereof executing on a respective one of a plurality of portable devices, wherein the modified audio content is, in the second instance, played back in a movie theater and via multiple audio channels, wherein the first receiving entity is configured to independently output the decoded text in each individual manner selected from aurally and visually.

14. A non-transitory computer-readable medium containing a program, which when executed is configured to perform an operation to collaboratively interpret acoustically detected playback of imperceptible audio content, the operation comprising:
during playback of audio content having perceptible audio content and augmented to include imperceptible audio content, acoustically detecting playback of both the perceptible audio content and the imperceptible audio content of the augmented audio content, by each of a first receiving entity and a second receiving entity operatively connected to the first receiving entity via a network;
collaboratively decoding, by operation of one or more networked computer processors when executing the program, the acoustically detected playback of the imperceptible audio content by the first and second receiving entities over the network and according to a predefined diversity scheme; and
generating an output by at least one of the first and second receiving entities, based on the acoustically detected, collaboratively decoded playback of the imperceptible audio content.

15. A system to collaboratively interpret acoustically detected playback of imperceptible audio content, the system comprising:
one or more networked computer processors; and
a memory containing a program, which when executed by the one or more networked computer processors is configured to perform an operation comprising:
during playback of audio content having perceptible audio content and augmented to include imperceptible audio content, acoustically detecting playback of both the perceptible audio content and the imperceptible audio content of the augmented audio content, by each of a first receiving entity and a second receiving entity operatively connected to the first receiving entity via a network;
collaboratively decoding the acoustically detected playback of the imperceptible audio content by the first and second receiving entities over the network and according to a predefined diversity scheme; and
generating an output by at least one of the first and second receiving entities, based on the acoustically detected, collaboratively decoded playback of the imperceptible audio content.

16. The system of claim 15, wherein the second receiving entity is spatially diverse from the first receiving entity, wherein the network comprises an ad-hoc network, wherein the ad-hoc network is selected from an ad-hoc Bluetooth network and an ad-hoc wireless fidelity (Wi-Fi) network.

17. The system of claim 15, wherein the predefined diversity scheme comprises adaptive space diversity with spreading code correlation sequences and cyclic redundancy check (CRC) optimization.

18. The system of claim 17, wherein the operation further comprises:
independently decoding intermediate data from the acoustically detected playback of the imperceptible audio content, by the first and second receiving entities; and
combining the intermediate data via majority voting to determine a final value for each bit of the imperceptible audio content.

19. The system of claim 18, wherein tie votes are determined in favor of a predefined bit value.

20. The system of claim 19, wherein the majority voting is weighted based on a respective receiver weight associated with each of the first and second receiving entities.

* * * * *